US007747487B2

(12) United States Patent
Hoffman

(10) Patent No.: US 7,747,487 B2
(45) Date of Patent: *Jun. 29, 2010

(54) BROWNFIELDS INVESTING

(75) Inventor: Cheryl Hoffman, Denver, CO (US)

(73) Assignee: CLHSM, LLC, Denver, CO (US)

( * ) Notice: Subject to any disclaimer, the term of this patent is extended or adjusted under 35 U.S.C. 154(b) by 1759 days.

This patent is subject to a terminal disclaimer.

(21) Appl. No.: 10/753,903

(22) Filed: Jan. 7, 2004

(65) Prior Publication Data

US 2004/0225585 A1 Nov. 11, 2004

Related U.S. Application Data

(63) Continuation-in-part of application No. 09/824,114, filed on Apr. 2, 2001, now Pat. No. 7,346,572, which is a continuation of application No. 09/488,112, filed on Jan. 20, 2000, now Pat. No. 6,253,191.

(60) Provisional application No. 60/152,467, filed on Sep. 3, 1999.

(51) Int. Cl.
*G06Q 40/00* (2006.01)

(52) U.S. Cl. .......................... 705/35; 705/30

(58) Field of Classification Search .............. 705/10–44
See application file for complete search history.

(56) References Cited

U.S. PATENT DOCUMENTS 5,214,579 A * 5/1993 Wolfberg et al. .......... 705/36 R 5,689,650 A * 11/1997 McClelland et al. ...... 705/36 R
5,812,987 A * 9/1998 Luskin et al. ............. 705/36 R

OTHER PUBLICATIONS

Buente, David T., Significant Environmental Law Developments, May/Jun. 1998, Secured Lender v54n3 pp. 52-66, ISSN: 0888-255X.*
Frye, Russel S., The role of private banks in promoting sustainable development, from outside counsel's perspective, 1988, Law & Policy in International Business v29n4, pp. 481-499.*
Bond, Sandy, Market participants' reactions toward contaminated property in New Zealand and th UAa, 1988, Journal of Property Valuation & Investment v16n3, pp. 251.*

* cited by examiner

*Primary Examiner*—Frantzy Poinvil
(74) *Attorney, Agent, or Firm*—Kenyon & Kenyon LLP

(57) ABSTRACT

A Brownfields investment vehicle, and a system and method for investing in Brownfields projects are provided that are capable of supporting a Brownfields project, while reducing the investors' exposure to the associated environmental liability. The Brownfields fund makes, for example, participating capital investments, each of which may be in the form of a tranched or untranched Brownfields Value Contract ("BVC") to a "special purpose vehicle" for a specific Brownfields project according to fund investment criteria determined by a fund manager. Each capital investment, or a portion thereof may be secured with a lien on the future cash flows and/or a portion or all of a Brownfields associated with the project. An investor's exposure to environmental liability from the projects is reduced, because the fund is completely passive with respect to the projects, despite the existence of liens on at least some of the capital investments provided by the Brownfields fund.

48 Claims, 17 Drawing Sheets

| | |
|---|---|
| 210 | General Fund Investment Criteria |
| 305 | The fund may invest in BVCs only after receiving a minimum level of investment into the fund (i.e., from investors 105 of Fig. 1). |
| 310 | The fund must invest in more than one Brownfields project and more than one BVC. |
| 315 | The overall investment in the fund must be large relative to the size of the Brownfields projects to which the fund issues a BVC. |
| 320 | The duration of the fund itself must be long-term relative to the duration of the Brownfields projects to which the fund issues a BVC. |
| 325 | Investors in the fund must be completely passive, having no ownership interests in the Brownfields, no security or mortgage interest in the Brownfields, and no obligations of environmental remediation, only an interest in the BVC. |
| 330 | Possibility of leveraging of the fund. |

FIG. 3

| | |
|---|---|
| 220 | General Project Investment Criteria |
| 405 | Duration of the BVC for a particular Brownfields project must be less than a predetermined authorized duration |
| 410 | Target rate of return for the particular BVC must be greater than a predetermined minimum |
| 415 | Investment or capital investment amount for the particular BVC must be greater than a predetermined minimum |
| 420 | Investment or capital investment amount for the particular BVC must be less than a predetermined maximum |

FIG. 4

| | |
|---|---|
| 230 | Technical Project Criteria |
| 501 | Cash flow participation in the particular Brownfields project defined in the BVC issued must be at a predetermined level |
| 502 | Types of real estate development |
| 505 | Geographic standards |
| 510 | Categories of contamination |
| 520 | Standards for risk management |
| 525 | Evaluation of government subsidies, grants, etc. |

FIG. 5

| 240 | Technical Criteria for Special Purpose Vehicles |
|---|---|
| 605 | Expertise in real estate development |
| 610 | Expertise in pollution remediation |
| 615 | Expertise in environmental risk management |
| 620 | Expertise in land use planning |
| 625 | Financial strength to meet its contractual obligations |
| 630 | Character references and track record |

FIG. 6

| 250 | Approved Entity Structures for Special Purpose Vehicles |
|---|---|
| 705 | A joint venture between an original owner and a real estate developer |
| 710 | A limited liability company, trust, partnership or other corporation formed and owned by a real estate developer |
| 715 | A limited liability company formed and owned by an original Brownfields owner, a real estate developer, and other partners |
| 720 | A limited liability company, trust, partnership or other corporation formed and owned by a developer and partners to purchase Brownfields properties over time with fixed installments, contingent installments, or fixed installments in combination with cash flow participation to the original Brownfields owner. |

FIG. 7

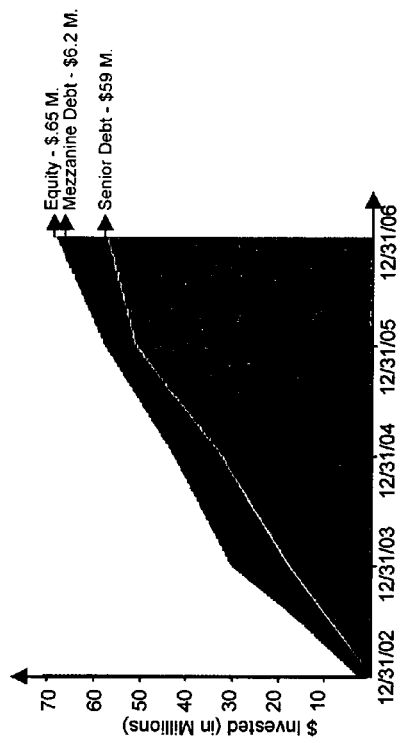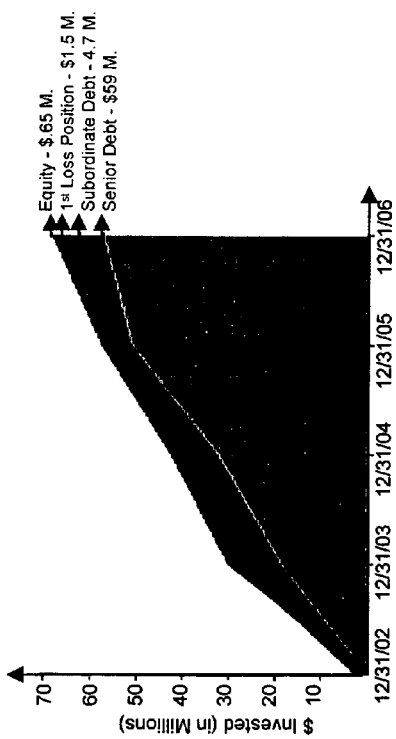
FIG. 12

BROWNFIELDS INVESTING

RELATED APPLICATIONS

This application is a continuation-in-part of the U.S. application Ser. No. 09/824,114, filed Apr. 2, 2001, now U.S. Pat. Ser. No. 7,346,572 which is a continuation of U.S. application Ser. No. 09/488,112, filed on Jan. 20, 2000, and issued as U.S. Pat. No. 6,253,191 on Jun. 26, 2001, which is a non-provisional U.S. patent application claiming priority to the U.S. provisional patent application Ser. No. 60/152,467, filed Sep. 3, 1999. Each of the applications referred to in this paragraph is incorporated by reference in its entirety into this application.

FIELD OF THE INVENTION

The present invention relates to a system and method and financial vehicle for investing in Brownfields.

BACKGROUND INFORMATION

For many years, contaminated properties have been considered a current and future liability to their owners (current and future), and to the communities in which they are located. The market value of real property is directly affected by contamination and pollution. Valuation of real property is negatively effected by risks that are not quantifiable in terms of time and/or money. Valuation affects decision making during cleanup of contaminated property, and, likewise, decision making during remediation affects valuation, of the contaminated property and surrounding properties. The result has been that many of these properties are idle and abandoned in spite of their potential value.

"Brownfields" generally includes real properties in a contaminated or stigmatized condition. Brownfields may include, for example, abandoned, idle or under-utilized sites, urban, rural, industrial or non-industrial real property where development, expansion or redevelopment is complicated by real or perceived contamination. In contrast, "Greenfields" are undeveloped properties located mainly in suburban or rural areas. Fear of contamination is one factor that may steer real estate development to Greenfields, with unintended but nonetheless undesirable consequences such as urban sprawl, habitat destruction or loss of land suitable for agriculture.

Conversely, redevelopment of Brownfields is expected to create economic opportunities through physical improvements, job creation, tax revenues and improved urban planning. Additionally, by redeveloping Brownfields, Greenfields, including, for example, agricultural land, may be preserved and further deterioration of urban cores can be minimized. There is also a substantial unmet need for private investment (e.g., debt, equity and hybrid investments) in Brownfields remediation. This is primarily due to the exposure (or fear of exposure) by investors to environmental liability.

The Environmental Protection Agency's (the "EPA") Environmental Financial Advisory Board (the "EFAB") spend two years researching issues related to financing Brownfields remediation, and issued five reports. The EFAB's core conclusion, set forth in a published letter dated May 31, 1997, from Robert O. Lenna and John C. Wise to EPA Administrator Carol M. Browne, was "wide-scale and long-term success of Brownfields redevelopment must be sustainable in the private sector." However, there continues to be relatively few capital sources for these projects due to the perceived risk. The risk includes:

(1) financial risk, either because the environmental risk is unknown or because it is difficult to measure; and
(2) liability associated with environmental risk, including liability for past effects of contamination (lender liability) and liability of borrowers from noncompliance that could affect their ability to meet financial obligation and the value of the collateral.

There is public acknowledgment and support for the need for private investment in Brownfields remediation. The EPA has now attenuated previous, more burdensome requirements, and has developed risk-based criteria for cleanup to allow the cleanup levels to be based in part on the future use of land, which is directly related to the potential for exposure to contaminants of concern.

In a report dated December 1997, the EFAB stated the following:

In virtually every Brownfields project scenario, the absence of a viable redevelopment project results in the perpetuation of two environmentally undesirable trends: (1) urban decay (environmentally, and further deterioration of existing taxpayer-paid infrastructure, and lack of economic opportunity for nearby residents); and (2) destruction of "Greenfields" to build development that could locate on Brownfields sites.

In our view, those two undesirable trends are not sustainable in the long term as a matter of national environmental or economic policy. We believe that requiring cleanups to meet appropriately-protective risk-based standards will both: (1) protect the public health and the environment; and (2) help to avoid the perpetuation of those two environmentally undesirable trends.

In addition to risk-based cleanup criteria, public support for Brownfields remediation exists in the Taxpayer Relief Act of 1007. Under this Act, a taxpayer may be able to deduct qualified remediation expenses incurred to clean up properties in several targeted areas. Moreover, taxpayers meeting the requirements of the Taxpayer Relief Act of 1997 are eligible to fully deduct Brownfields cleanup costs in the year in which the costs are incurred, rather than capitalizing and amortizing the costs over several years.

Moreover, certain recent revisions to the Comprehensive Environmental Response, Compensation, and Liability Act (CERCLA) are aimed at protecting passive investors. In particular, CERCLA Section 101(20)(A) contains a secured creditor exemption which eliminates certain liability for lenders who hold indicia of ownership in a Brownfields facility primarily to protect their security interest in that facility, provided they do not participate in management of the facility.

Despite the widespread public acknowledgment of the need for large private investment in Brownfields remediation, and despite the public support for such private investment in the form of rational environmental regulation and tax incentives, there is no useful method or vehicle for large-scale, long-term investment in Brownfields remediation. Conventional private investment in remediation of Brownfields includes only small funds investing on a project-by-project basis, with the quantity of capital available being small in relation to the remediation and development cost of the project financed. Because the remediation costs of individual projects financed is often so large in relation to the type of funds available, the investment risks are large, for financing the cleanup phase, and the cost of capital, therefore, high and the success of the process may be dependent upon the market for the land and development subsequent to clean up, increasing the risk. Moreover, the legal and financing phases are long and expensive. Financial failure of a single project in such a financial model is a disaster for all of the investors. However, if the ultimate development of the property is also considered, the cost of remediation becomes economically feasible in relation to the long-term value.

Moreover, environmental remediation liability, i.e., the legal duties under applicable federal, state and local statutes and regulations regarding environmental liabilities, may attach not only to the owners of the Brownfields, but also to "operators." Operators may include, for example, lenders and others who participate in decision making regarding the Brownfields. Thus, lenders investing in properties needing remediation can themselves become liable for remediation costs if lenders take mortgages to secure their loans. This risk of direct exposure to environmental remediation liability further chills investor interest and increases the cost of privately-financed remediation of Brownfields. Thus, historically, only a small number of investors were able and willing to invest privately in projects involving Brownfields remediation and they expect high returns relative to the risk. This capital cost is another barrier to the feasibility of these projects.

Because of the traditional high risks associated with Brownfields remediation investment, few vehicles exist for such investment. Moreover, few managers have developed expertise sufficient to administer the few such investment vehicles that do exist. There are approximately 5000 registered professional investment advisors for management of a wide variety of investments in stocks, stock portfolios, bonds, and stock and bond funds. There are only a few dozen registered professional real estate investment managers, and only a handful of these managers control the majority of the market (75%). These managers offer very traditional pure equity, first mortgage and participating mortgage products not suited to the this type of investment. However, this investor base is the best source for long term capital.

With few sources of investment capital available for financing Brownfields remediation, Brownfields' owners must often rely on their own financial resources to provide the funds for remediation. These owners include most major industrial corporations, family owned businesses, government entities, farmers, developers and many others. This further constrains resources available to the ongoing business interests of these owners, and therefore, redevelopment is delayed indefinitely.

Moreover, real estate developers typically encounter substantial project delays with attendant costs because there is no single mode of financing that will cover all phases (e.g., acquisition, entitlement, development and construction) of a project. Developers must first arrange financing for acquiring the property and developing plans and designs. The project then typically halts for weeks or months while the developer arranges construction financing. Near the end of the construction phase, the project may be effectively halted again while the developer seeks and arranges permanent financing or sells the project. All three stages of financing are typically provided by separate sources, and financing fees may be required in connection with each stage of financing. Thus, there is a substantial need for a single source of financing to address all stages of a real estate project to lower the cost of capital and facilitate faster completion of a projection. This will also make projects that are not feasible today become feasible including redevelopment of Brownfields.

Furthermore, the three stages of financing are typically carried as full debt on the developer's balance sheet. Carrying environmental project-related debt on the balance sheet reduces the developer's and/or owner's equity, and, therefore, reduces the developer's and/or owner's ability to borrow funds for new projects, expansion, or to support normal operations. Accordingly, there is a need for a method of financing real estate development without reducing a developer's equity or borrowing power ("off balance sheet" financing and/or investment).

SUMMARY

The present invention responds to the need for private investment in projects involving Brownfields remediation/development/redevelopment. In accordance with an example embodiment of the present invention, a Brownfields investment vehicle (financial instrument), and a system and method for investing in Brownfields-related projects are provided that are capable of supporting all aspects of a Brownfields remediation/development/redevelopment project, while shielding investors from environmental liability.

In an example embodiment, a Brownfields investment fund is established in accordance with certain criteria. The Brownfields fund provides capital on a non-recourse basis through Brownfields Value Contracts ("BVC") to a number of approved "special purpose vehicles" for specific Brownfields projects according to fund investment criteria determined by a fund manager. These "special purpose vehicles" meet technical and financial criteria established by a fund manager.

The present invention substantially reduces an investors risk in incurring environmental liability by providing that the Brownfields fund is completely passive with respect to the Brownfields project, taking no security or mortgage interest in the Brownfields property.

In an example embodiment, a method for investing in Brownfields includes: establishing a Brownfields fund, receiving investor capital from investors in the Brownfields fund, approving an entity for the investment capital for the Brownfields project according to predetermined criteria, and providing the investment capital for the Brownfields project on behalf of the approved entity using at least some of the investor capital from the investors. The Brownfields fund provides investment capital for the Brownfields project and remains passive with respect to the Brownfields project. The entity has an ownership interest in the Brownfields or Brownfields property associated with the Brownfields project. At least a first portion or part or all of the investment capital being provided for the project is provided with a lien on at least a portion or all of the Brownfields property.

In an example embodiment, a Brownfields investment vehicle includes a Brownfields fund providing investment capital on a non-recourse basis for a Brownfields project associated with a Brownfields on behalf of an approved entity. At least a first portion of the investment capital or all of the investment capital being provided has a lien on at least a first portion or all of the Brownfields. The approved entity has an ownership interest in the Brownfields. The Brownfields fund remains passive with respect to the project, receives investor capital from at least one investor, and provides a return on investment to its investor(s).

In an example embodiment, a Brownfields investment vehicle includes a tranched Brownfields Value Contract setting forth terms and conditions of the provision of investment capital by a Brownfields fund for a Brownfields project associated with a Brownfields, on behalf of an approved entity having an ownership interest in the Brownfields property. The Brownfields fund remains passive with respect to the project, receives investor capital from at least one investor, uses at least some of the received investor capital to provide the investment capital, and provides a return on investment to the at least one investor.

In an example embodiment, a method for managing a Brownfields fund includes: storing in a computer system information relating to a Brownfields fund, accepting investor capital from at least one investor, storing information in the computer system relating to the at least one investor, storing information in the computer system concerning an entity and a project involving a Brownfields, approving the entity and the Brownfields project according to predetermined criteria using the information stored in the computer system concerning the entity and the Brownfields project, and providing investment capital by the Brownfields fund for the approved Brownfields project on behalf of the approved entity. The stored information includes investor identification information, investment amounts, and terms of investments. The entity has an ownership interest in the Brownfields. At least a first portion or all of the investment capital being provided by the Brownfields fund for the project, is provided with a lien on at least a first portion or all of the Brownfields.

In an example embodiment, a method of investing in Brownfields includes: providing investor capital to a Brownfields fund in accordance with predetermined terms of investment, and receiving a return on the provided investor capital. The Brownfields fund provides investment capital for a Brownfields project and remains passive with respect to the Brownfields project. The Brownfields fund approves an entity for the investment capital for the Brownfields project according to predetermined criteria. The entity has an ownership interest in a Brownfields associated with the one of the Brownfields projects. The investment capital is provided for the Brownfields project on behalf of the approved entity using at least some or all of the investor capital from the investor. At least a first portion or all of the investment capital being provided by the fund for the project on behalf of the approved entity, is provided with a lien on at least a first portion or all of the Brownfields associated with the Brownfields project. The return on the investor capital is determined as a function of the predetermined terms of investment.

In an example embodiment, a method for investing in Brownfields includes: establishing a Brownfields fund, receiving investor capital from investors, approving an entity for the investment capital for the Brownfields project according to predetermined criteria, and providing the investment capital to the approved entity using at least some of the investor capital from the investors. The Brownfields fund provides investment capital for a Brownfields project and remains passive with respect to the Brownfields project. The entity has an ownership interest in a Brownfields property associated with the Brownfields project. A first portion of the investment capital being provided by the fund is provided on a non-recourse basis, for, e.g., remediation and/or development of a part or portion or all of the Brownfields property.

In an example embodiment, a method for investing in Brownfields includes: establishing a Brownfields fund, receiving investor capital from investors, approving an entity for the investment capital for the Brownfields project according to predetermined criteria, and providing the investment capital to the approved entity using at least some of the investor capital from the investors. The Brownfields fund provides investment capital for a Brownfields project and remains passive with respect to the Brownfields project. The entity has an ownership interest in a Brownfields property associated with the Brownfields project. At least a first portion of the investment capital provided by the fund for the project is provided as secured financing, e.g., secured with a lien or other legal claim or interest.

In an example embodiment, a method of investing in Brownfields includes establishing a Brownfields fund, receiving investor capital from investors, approving an entity for the investment capital for the Brownfields project according to predetermined criteria, and providing two or more classes of investment capital or financing for the Brownfields project on behalf of the approved entity using at least some of the investor capital from the investors. The Brownfields fund provides the investment capital for the Brownfields project and remains passive with respect to the Brownfields project. The entity has an ownership interest in a Brownfields property associated with the Brownfields project. The two or more classes of investment capital or financing is provided by the fund in accordance with terms of a tranched Brownfields Value Contract. Each class of investment capital is provided in accordance with the terms under its respective tranche.

BRIEF DESCRIPTION OF THE DRAWINGS

FIG. 3 illustrates examples of general fund investment criteria 210 used by the fund manager in determining whether or not the Brownfields fund should make a BVC to a Brownfields project.

FIG. 4 illustrates examples of general project investment criteria 220 that the fund manager may require a particular Brownfields project to meet in order for the Brownfields fund to make a BVC therein.

FIG. 5 illustrates examples of technical project criteria which the Brownfields project may be required to meet in order to qualify for a capital investment from the Brownfields fund through a BVC.

FIG. 6 shows example technical criteria which the special purpose vehicle may be required to meet in order to be approved by a fund manager.

FIG. 7 illustrates examples of approved entity structures according to the example embodiment of the present invention.

FIG. 12 shows two example tranched Brownfields Value Contracts, and the returns on each tranche, according to an example embodiment of the present invention.

DETAILED DESCRIPTION

Figure 1:
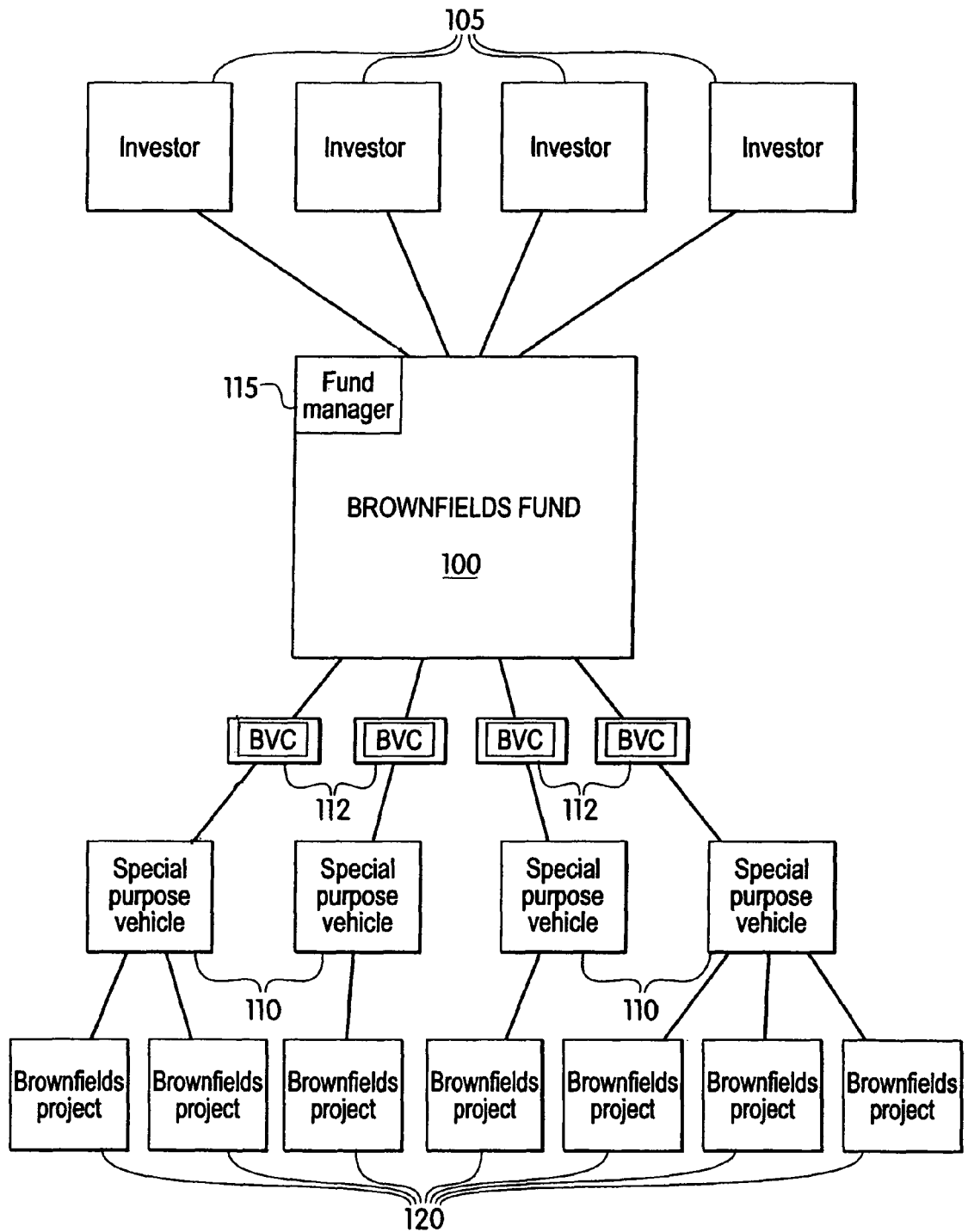
FIG. 1 shows an overview of an overall architecture of a system for Brownfields development investing according to an example embodiment of the present invention.

Overview: FIG. 1 shows an overview of the overall architecture of a system for Brownfields remediation, development and redevelopment investing according to an example embodiment of the present invention. As illustrated, a Brownfields investment fund 100 is established in which investors 105 invest (e.g., provide capital). In accordance with the example embodiment of the present invention, the Brownfields investment fund 100 may be any type of business organization created for financing Brownfields projects according to the present invention, including, but not limited to organizations such as a limited liability partnership, a limited liability company, a trust or other corporation.

The investors 105 may be, for example, parties who provide capital to the Brownfields fund for the purpose of earning a return on their capital through BVCs 112 made by the Brownfields fund. These investors 105 may be, for example, accredited investors under federal securities laws, qualified investors, sophisticated investors, ERISA investors, private placement investors, or any other type of private equity investor.

The Brownfields fund 100 makes, for example, non-recourse, participating capital investments or "Brownfields Value Contracts" ("BVC") 112 to a number "special purpose vehicles" 110, for specific Brownfields projects 120 according to fund investment criteria determined by a "fund manager" 115. In the example embodiment of the present invention, a BVC 112 may include, for example, a financial obligation resulting from application and compliance with specific criteria to create value in development or redevelopment of Brownfields and provides returns from that value to investors. For example, the BVC 112 may set forth terms and conditions such as: i) the amount of capital to be provided to a special purpose vehicle, such capital may be provided in a lump sum, or in installments; ii) details of an interest in future cashflows provided to the Brownfields fund by the special purpose vehicle, iii) performance requirements of a project, iv) reporting requirements, etc.

Each special purpose vehicle owns a respective real estate interest in one or more Brownfields projects, and, thus, undertakes some or all environmental remediation liability with respect to their respective Brownfields. These special purpose vehicles 110 may include, for example, the original owner of the Brownfields and/or another entity to whom the original owner has transferred ownership. Each of the special purpose vehicles 110 and their respective Brownfields projects 120 may be qualified by the fund 100 according to criteria as determined by the fund manager 115. Brownfields projects may include, for example, environmental remediation, and one or more of the following: land planning, zoning, construction and infrastructure construction (e.g., streets, sewers, lighting, architectural planning and design, establishing real estate property access from existing highways to the project), communication infrastructure constructions (e.g., telephone, fiber optic access, satellite access and cable access), demolition and remodel.

The fund manager 115 may be, for example, a business organization, individual or group of individuals which act as a money manager for the Brownfields fund 100. The fund manager 115 may have authority to establish criteria for qualifying a particular special purpose vehicle and associated Brownfields project 120 for a BVC, and may solicit money from investors 105 in order to fund these BVCs. The fund manager 115 may, for example, administrate and report on the operations of the Brownfields fund 100.

In accordance with the present invention, the risk of environmental remediation liability for the investors 105 is greatly reduced since the investors 105 are completely passive with respect to the ownership and operations of the Brownfields. The investors 105, for example, have no ownership interest in the Brownfields, have no security interest or mortgage interest in the Brownfields, and, thus, have no obligations of environmental remediation. Instead, upon providing a BVC to a special purpose vehicle 110 for a particular Brownfields project 120, the Brownfields fund 100 may acquire a financial interest in future cash flows from the Brownfields project 120.

Figure 2:
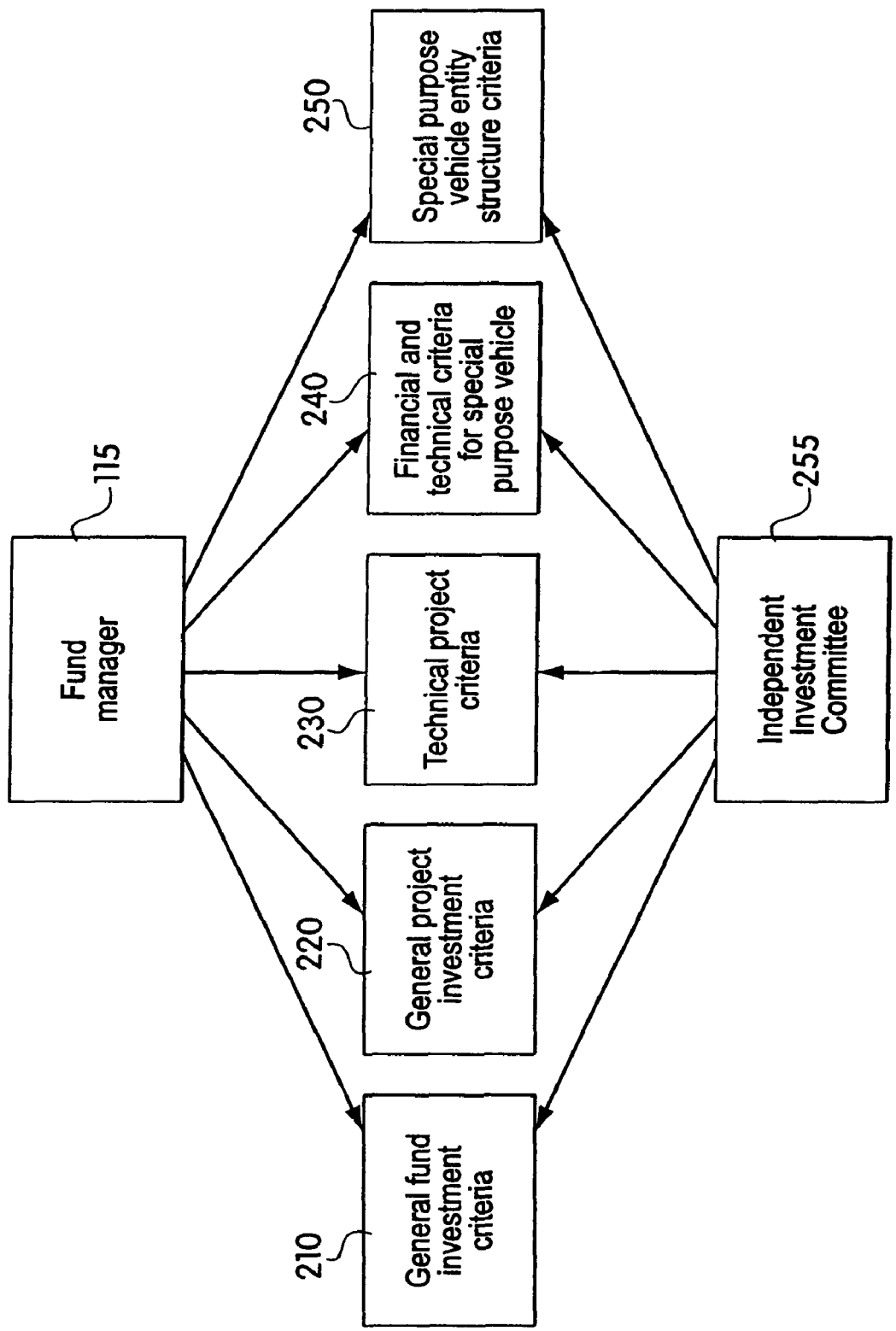
FIG. 2 shows an overview of criteria that the Brownfields fund, the special purpose vehicle and the Brownfields project may be required to meet, according to the example embodiment of the present invention.

Criteria Overview: As noted above, the fund manager 115 may set forth various criteria for approving BVCs to special purpose vehicles for Brownfields projects. As shown in FIG. 2, the fund manager 115 may define general fund investment criteria 210 for the Brownfields fund itself. Furthermore, the fund manager 115 may set forth general project criteria for a Brownfields project 220, technical criteria for the Brownfields project 230, technical criteria for the special purpose vehicle 240 associated with the Brownfields project, and entity structure criteria 250. Assuming the fund manager believes that the Brownfields fund itself, the particular special purpose vehicle in issue and the Brownfields project in issue meet all of the required criteria, the fund manager may recommend BVC approval.

In the example embodiment, an Independent Investment Committee 250 may be required to concur with the recommendation of the fund manager 115 before a capital investment is finally approved. The Independent Investment Committee 250 may be comprised of persons having expertise in areas of environmental engineering, environmental law, real estate development, real estate development project feasibility analysis, real estate finance and real estate investment fund analysis. The member of the Independent Investment Committee typically should have no interest in the fund or in any entity any way involved in investments reviewed by the Committee.

General Fund Investment Criteria: FIG. 3 illustrates examples of general fund investment criteria 210 used by the fund manager in determining whether or not the Brownfields fund should make an investment in any BVC. As shown in element 305, in accordance with the example embodiment of the present invention, the Brownfields fund may invest in BVCs only after receiving a minimum level of investment into the fund. In effect, the Brownfields fund must have a certain amount of capital available with which to invest in BVCs. Additionally, the Brownfields fund must invest in more than one Brownfields project and more than one BVC (element 310). In an alternative embodiment of the present invention, the Brownfields fund may invest in only one Brownfields project, and one or more BVCs.

Also, the overall investment in the Brownfields fund should be large relative to the size of the BVCs in which the fund invests (element 315). For example, the Brownfields fund may be required to manage between $500 million to $1 billion dollars worth of money, securities, and other assets. A typical BVC may be worth, for example, between $5 million dollars and $50 million dollars. Larger and smaller projects are, of course, possible.

Moreover, the duration of the Brownfields fund, itself, must be long-term relative to the duration of the BVCs in which the fund invests (element 320). For example, the Brownfields fund may have a duration of three to ten years, while typical BVCs may have durations of 12 months to 120 months.

Each of the criteria 305, 310, 315 and 320 are established to ensure that the Brownfields fund adequately spreads its financial risk.

Additionally, in accordance with the present invention, the investors in the Brownfields fund must be completely passive with respect to all of the Brownfields projects in which the Brownfields fund invests through a BVC (element 325). Neither the investors, nor the Brownfields fund itself should take any ownership interest in the Brownfields. For example, neither the investors nor the Brownfields fund should take a security interest or mortgage interest in the Brownfields. Accordingly, the risk of the investors of the Brownfields fund incurring environmental remediation liability is greatly reduced, if not eliminated.

Finally, the possibility of leveraging the fund may be a factor (element 330) to reduce the cost of the BVC. Specifically, in order to reduce the cost of the BVC for the SPV, the fund and/or one or more of the BVCs provided by the fund, may be leveraged with single or multiple tiered debt financing, and/or with other sources of capital, in addition to the capital contributed by the equity investors in the form of direct money investments, securities and other assets. The fund, or its respective BVCs, may have a tranched structure, and issue security and/or debt instruments for each source of capital, with each type of instrument having different parameters, for example, different rates of return, payment terms, priority, and/or maturity dates.

General Project Investment Criteria: FIG. 4 illustrates examples of general project investment criteria 220 that the fund manager may require a particular Brownfields project to meet in order for the Brownfields fund to make a BVC. In accordance with the example embodiment of the present invention, the duration of the financing (i.e., the duration of the BVC) for a particular Brownfields project must be less than a predetermined authorized duration (element 405). Additionally, the target rate of return for the Brownfields fund must be greater than a predetermined minimum (element 410). Furthermore, the investment or capital investment amount to the particular BVC must be greater than a predetermined minimum amount (element 415) and less than a predetermined maximum amount (element 420).

Technical Project Criteria: FIG. 5 illustrates examples of technical project criteria 230 which the Brownfields project may be required to meet in order to qualify for a capital investment from the Brownfields fund. In accordance with the example embodiment of the present invention, the cash flow participation in the particular BVC should be at a predetermined level (element 501). For example, the capital investment made by the Brownfields fund to the special purpose vehicle for the particular Brownfields project may be exchanged for future cash flow of the Brownfields project. That is, the Brownfields fund may be entitled to a share of the revenue of the Brownfields project until the capital investment (plus interest or return) is recovered, in accordance with the terms of the BVC.

The fund manager may also set forth the types of real estate development approved for the Brownfields project (element 502). For example, the building of an industrial complex may be an approved type of Brownfields project, while the building of an apartment building may not be. The fund manager may revise criteria from time to time in response to changes in various markets.

As shown, the Brownfields project may be required to meet certain geographic standards (element 505). For example, in an example embodiment of the present invention, the Brownfields may be required to be located in one of a number of acceptable states or counties in the United States. Moreover, demand for the proposed development project in the particular geographic area should be adequate.

Additionally, the type of contamination associated with the Brownfields may be required to be in one of a number of contamination categories (element 510). For example, in one embodiment of the present invention, contamination due to an oil spill or leakage may be within an "approved" category, while contamination due to nuclear waste may not be.

Also, the fund manager may set forth certain standard for risk management in association with the Brownfields project (element 520). For example, the special purpose vehicle may be required to assure that adequate and trained staff qualified to perform the proposed development of the Brownfields project will be used and risk management is appropriate (e.g., insurance, indemnities).

Finally, the fund manager may require evaluation of all available government subsidies, grants, etc (element 525).

Technical Criteria For Special Purpose Vehicles: FIG. 6 shows example technical criteria which the special purpose vehicle (240) may be required to meet in order to be approved by a fund manager. The special purpose vehicle may be required to have a certain level of expertise in real estate development (element 605). For example, the special purpose vehicle may be required to have been involved with at least a specified number of large-scale real estate development projects. For example, the special purpose vehicle may be required to have principals with minimum net worth requirements and references.

Additionally, the special purpose vehicle may be required to have a certain minimum level of expertise in pollution remediation (element 610). Moreover, the special purpose vehicle may be required to have expertise in environment risk management (element 615). Finally, the special purpose vehicle may be required to have a certain expertise in land use planning (element 620). In one embodiment of the present invention, criteria 610, 615 and 620 may be met by the special purpose vehicle by, for example, retaining, or consulting or partnering with a technical consultant in these areas.

The fund manager may also evaluate the financial strength of the special purpose vehicle to meet contractual obligations (element 625)

Approved Entity Structures: As noted above, the fund manager may also establish approved entity structures for the special purpose vehicle (element 250). FIG. 7 illustrates examples of approved entity structures. Approved entity structures may include, for example, a joint venture between an original owner of the Brownfields and a real estate developer (element 705), a limited liability company, partnership, trust or corporation formed and owned by a real estate developer (element 710), a limited liability company, partnership, trust or corporation formed and owned by an original owner, a real estate developer and other partners (element 715), and a limited liability company, partnership, trust or corporation formed and owned by a developer and partners to purchase Brownfields over time with fixed installments, contingent installments or fixed installments in combination with cash flow participation (element 720). Other entity structures are, of course, possible. Moreover, the original owner of the Brownfields may be so anxious to remove the Brownfields from its balance sheet that the original owner actually pays another entity, e.g., a special purpose vehicle, to accept title to the Brownfields.

Figure 8:
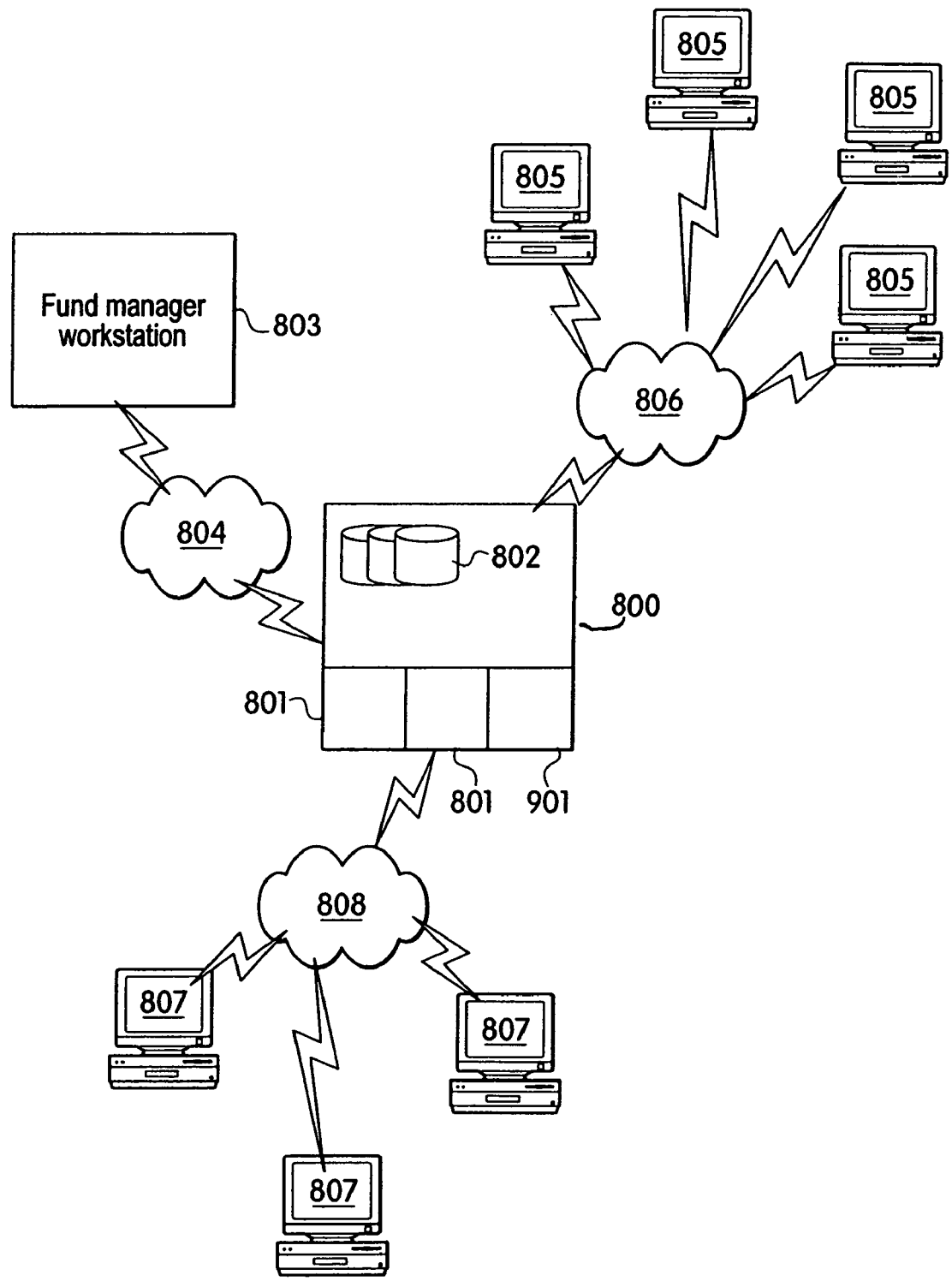
FIG. 8 shows the overall architecture of a computer based system for Brownfields development investing.

Computer Based System: FIG. 8 illustrates a computer based system for Brownfields investing in accordance with an example embodiment of the present invention. Information concerning the Brownfields fund may be stored, managed and updated at a central site 800. The central site 800 may include, for example, one or a number of server systems 801 (each including, for example, a processor, memory, and various peripheral devices). The central site 800 may also include a number of databases (stored on storage devices) 802 coupled to one or more of the server systems 801.

The fund manager may access and update the Brownfields fund information using, for example, a fund manager workstation 803 coupled to the central site 800 via a network 804. The network may include, for example, a telecommunications network, a local area network, a wide area network, the Internet, etc. Of course, it is also possible that the fund manager workstation is directly coupled to the central site 800. The fund manager workstation 803 may be required to log into one of the server systems 801 in order to access and update information.

Investors (current and potential) may request or access information concerning the Brownfields fund, review and update investor account information, authorize fund transfers into the Brownfields fund, etc., using investor workstations 805 coupled to the central site 800 via a network 806. The network 806 may include, for example, the Internet, and investor workstations 805 may be provided secure links to the central site for some types of transactions. Other networks such as a telecommunications network, a local area network, a wide area network, etc., are, of course possible. Each investor workstation 805 may be required to log into one of the servers 801 at the central site 800 in order to access and/or update information.

Special purpose vehicles may also request or access information concerning the Brownfields fund, review and update special purpose vehicle account information, transmit Brownfields project proposals, using, for example, SPV workstations 807 coupled to the central site 800 via a network 806. Each SPV workstation 807 may be required to log into one of the server systems 801 in order to access and/or update information.

Figure 9A:
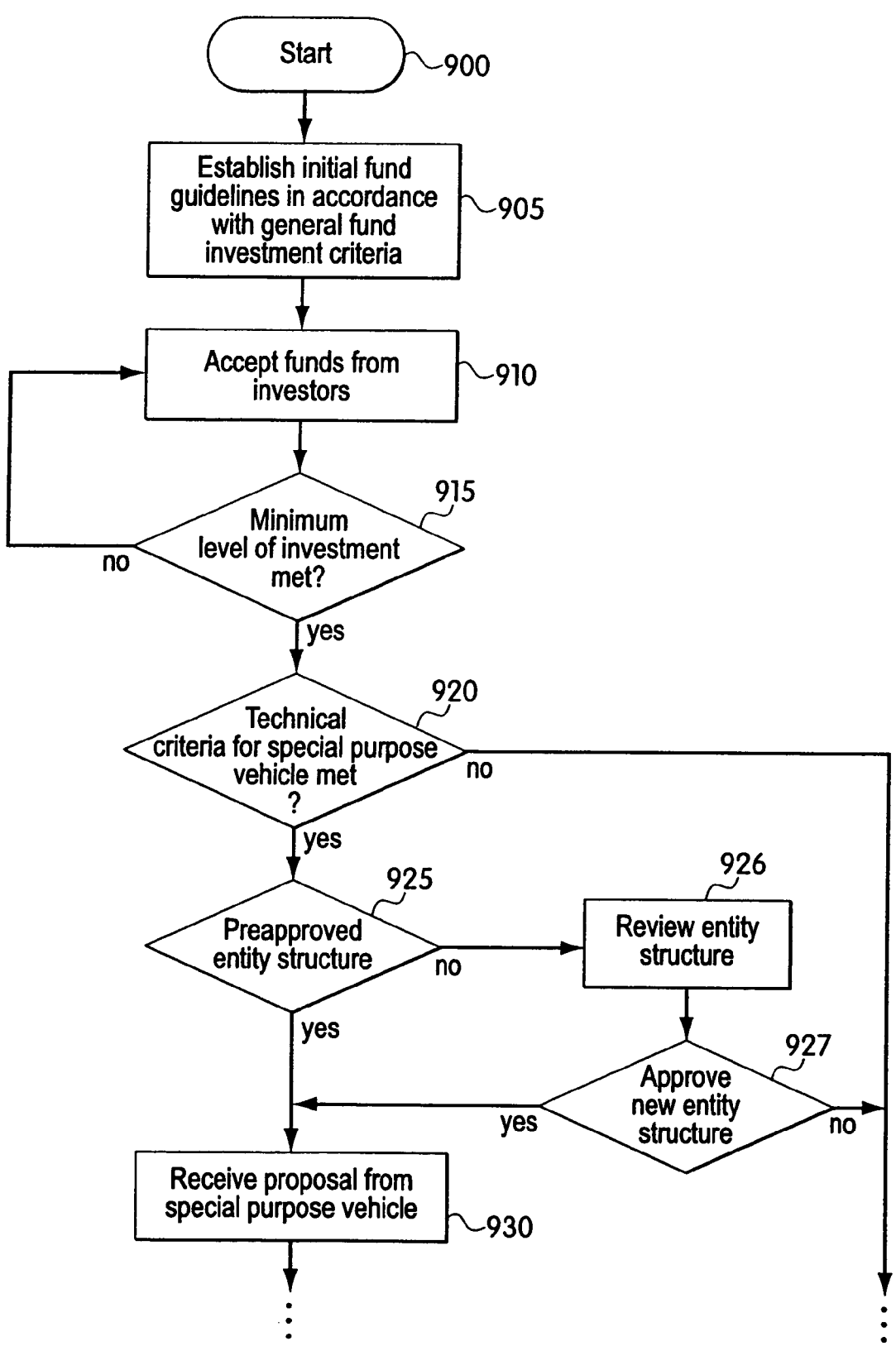
FIG. 9 is a flowchart showing an example method for establishing a fund and for approving special purpose vehicles and their respective Brownfields process, according to an example embodiment of the present invention.
Figure 9B:
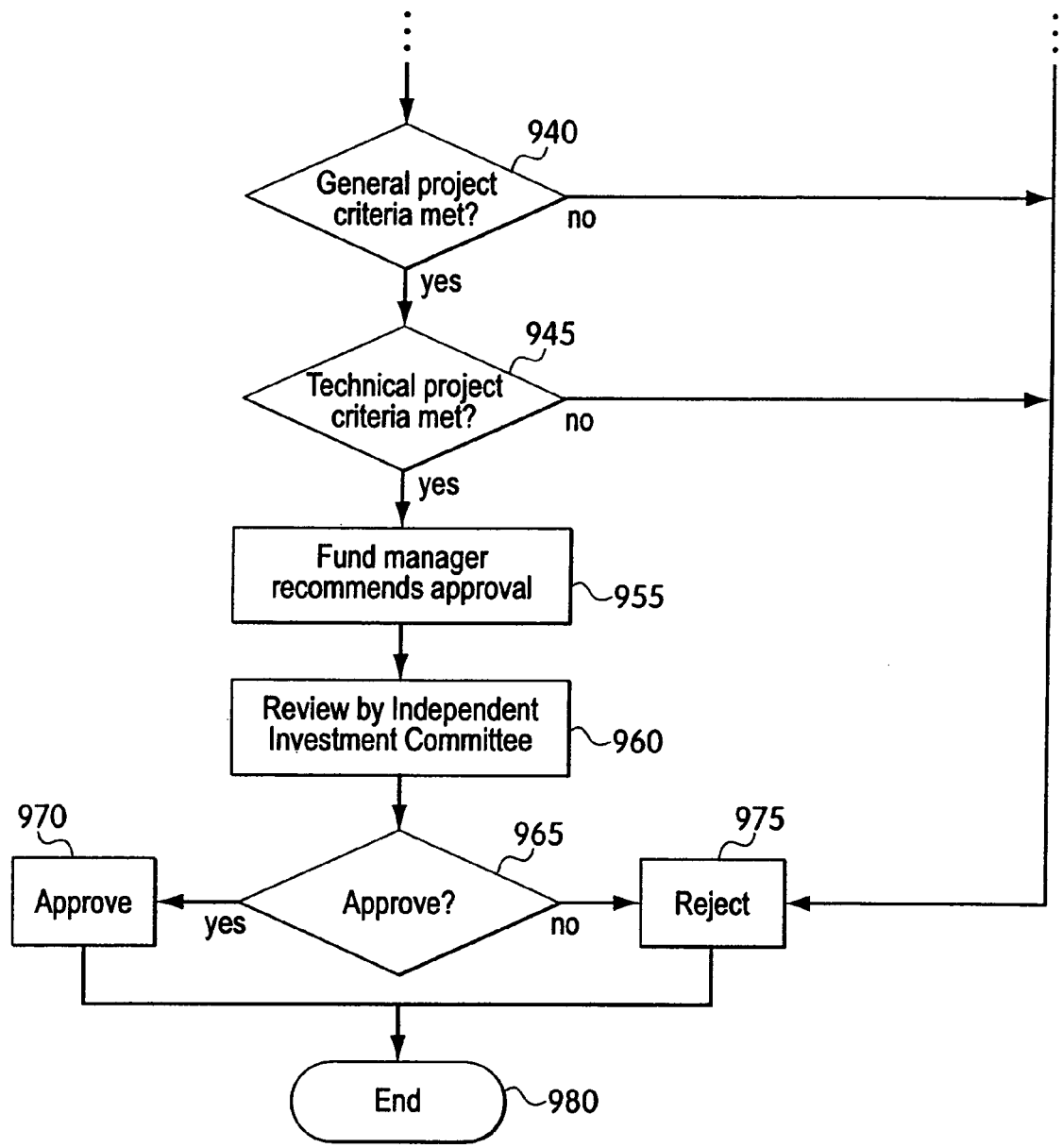

Fund Formation/Approval Process: FIG. 9 is a flowchart showing an example method for establishing a fund and for approving special purpose vehicles and their respective Brownfields projects. This method may be partially or completely performed using the computer based system shown in FIG. 8. The method may also be carried out without any computer based system.

In accordance with an example embodiment of the present invention, initial fund guidelines are established for the Brownfields fund in accordance with the general fund investment criteria described above (step 905). These guidelines may be input, for example, from the fund manager terminal and stored in databases at the central site.

Once the guidelines are established, the Brownfields fund begins accepting funds (i.e., investments or capital) from investors (step 910). In accordance with the present invention, the investors may transmit funds to the Brownfields fund via, for example, mail, electronic funds transfer, hand delivery, or may authorize a funds transfer via an investor workstation or via a telephone.

As soon as the investment level is high enough (steps 915, 910), the Brownfields fund determines whether or not prospective special purpose vehicles meet the technical criteria (step 920), as discussed above in connection with FIG. 6. Also, the fund manager determines whether or not the special purpose vehicle is in the form of one of the pre-approved entity structures (as described in connection with FIG. 7, for example) (step 925). A list of the pre-approved structures may be stored at the central cite in, for example, one of the databases. The fund manager may use an expert system or another computer-based system to compare the details of the form of the special purpose vehicle (provided by the special purpose vehicle in connection with the proposal) with the pre-approved entity structure. Alternatively, the fund manager may manually perform the comparison. If the special purpose vehicle is not in the form of a pre-approved entity structure, the fund manager may need to review details of the structure of the special purpose vehicle to determine whether or not the special purpose vehicle is in an acceptable form (steps 926, 927). (In an alternative embodiment of the present invention, the pre-determined entity structures are merely suggested structures.)

Assuming the special purpose vehicle meets the technical criteria (for example, as described in connection with FIG. 6) and the form of the special purpose vehicle is determined to be acceptable, the Brownfields fund receives a project proposal from the special purpose vehicle (step 930). A Brownfields project proposal may be transmitted to the fund manager via, for example, mail, facsimile, hand delivery, etc., or may be electronically transmitted to the central site via an SPV workstation. Details of the proposal may be manually or automatically entered and stored at the central site.

In the example embodiment of the present invention, once a particular proposal is received, the fund manager next determines whether or not the proposed Brownfields project meets the general project investment criteria, for example, as described in connection with FIG. 4 (step 940). If not, the proposal is rejected (step 975). If the proposed Brownfields project does meet the general project investment criteria, the fund manager determines whether or not the proposed Brownfields project meets the technical project criteria, as described in connection with FIG. 5 (step 945). If either of these criteria are not met, the proposal is rejected (step 975).

According to the present invention, the fund manager may perform steps 920, 940 and 945 using a computer rules-based system (other systems are possible). For example, each of the general project criteria, technical project criteria and technical criteria for the special purpose vehicle may be stored in the system in the form of a rule. Using the rules-based system, the details of the project proposal may be compared to the stored rules. Thus, steps 920, 940 and 945 may be performed automatically at the central site. Alternatively, the criteria may be stored in databases, and printed out by the fund manager. The fund manager could then manually compare the details of the project proposal to the criteria.

If all of the above-described criteria are met, the fund manager recommends approval of a capital investment to the special purpose vehicle for the Brownfields project (step 955). The proposal is then reviewed by the Independent Investment Committee (960) for final approval. The Independent Investment Committee may review the proposal as compared to the same criteria used by the fund manager, or may review the proposal in terms as compared to other criteria.

Finally, if the Independent Investment Committee approves the proposal (step 965), the special purpose vehicle and proposed Brownfields project is finally approved (step 970), thus the Brownfields fund provides a capital investment to the special purpose vehicle for the proposed Brownfields project through the terms of a BVC. Otherwise, the proposal is rejected (step 975). An indication that the capital investment has been approved or rejected may be transmitted to the special purpose vehicle electronically by the central site. Alternatively, the fund manager or the Independent Investment Committee may provide the indication via the telephone or mail.

Figure 10:
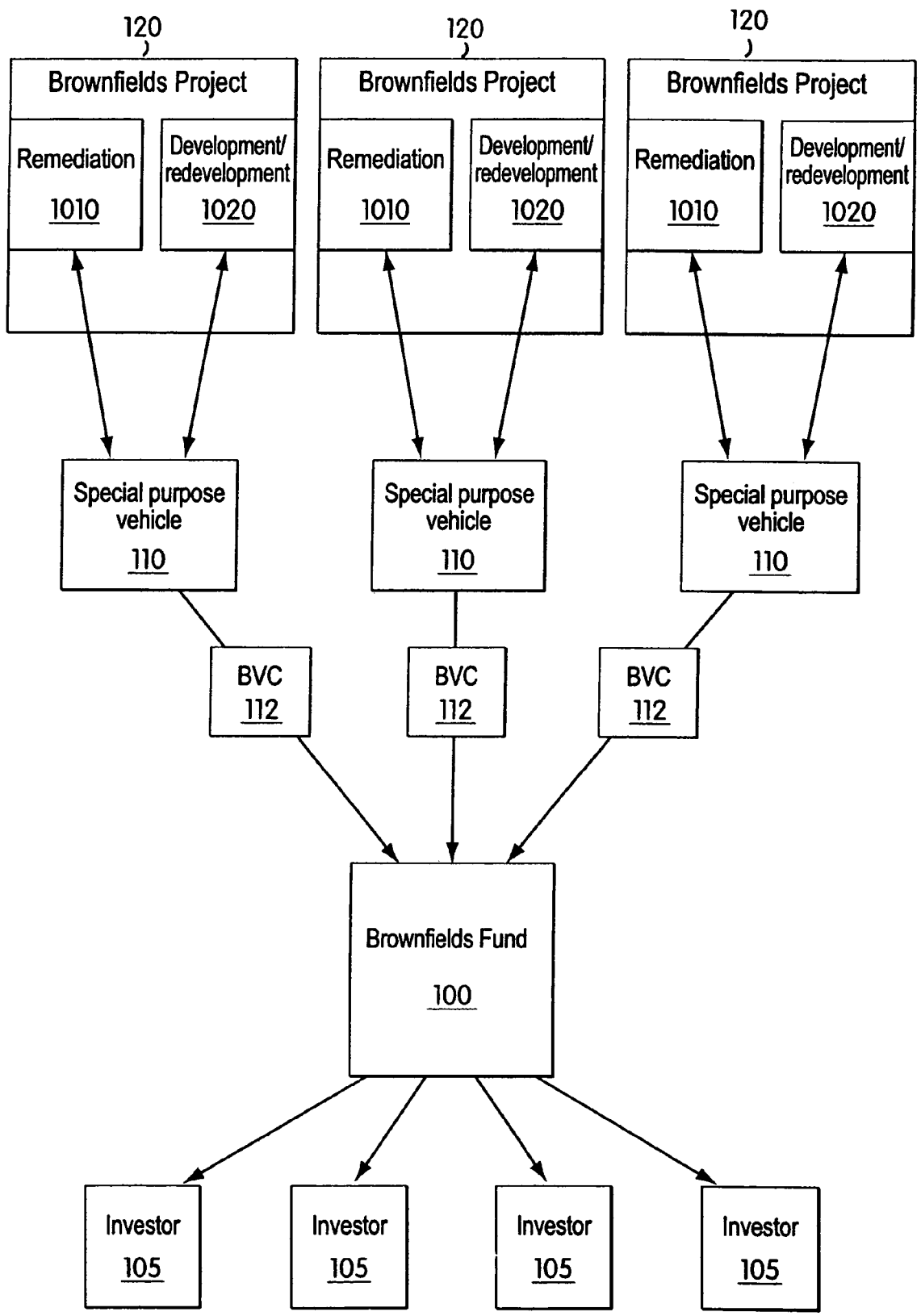
FIG. 10 shows an overview of cash flows associated with the present invention.

Cashflow Overview: FIG. 10 shows an overview of cash flows associated with the present invention. As shown, each Brownfields project 120 may include two sources of cash flows. In particular, both the remediation phase 1010 (i.e., the clean-up) of the Brownfields project 120 and the development/redevelopment (e.g., the actual construction project) may each generate a cash flow for the special purpose vehicle 110.

According to the example embodiment of the present invention, each special purpose vehicle 110 is required under the terms of, for example, the Brownfields Value Contract with the Brownfields fund 100, to pay to the Brownfields fund 100 a certain share of the special purpose vehicles's (future) cash flow. Thus, a cash flow to the Brownfields fund 100 is generated once the special purpose vehicle's cash flow is realized.

Moreover, according to the example embodiment, each investor 105 is entitled, under the terms of, for example, an Investor Investment Contract, to a certain portion of the cash flow received by the Brownfields fund 100.

Figure 11:
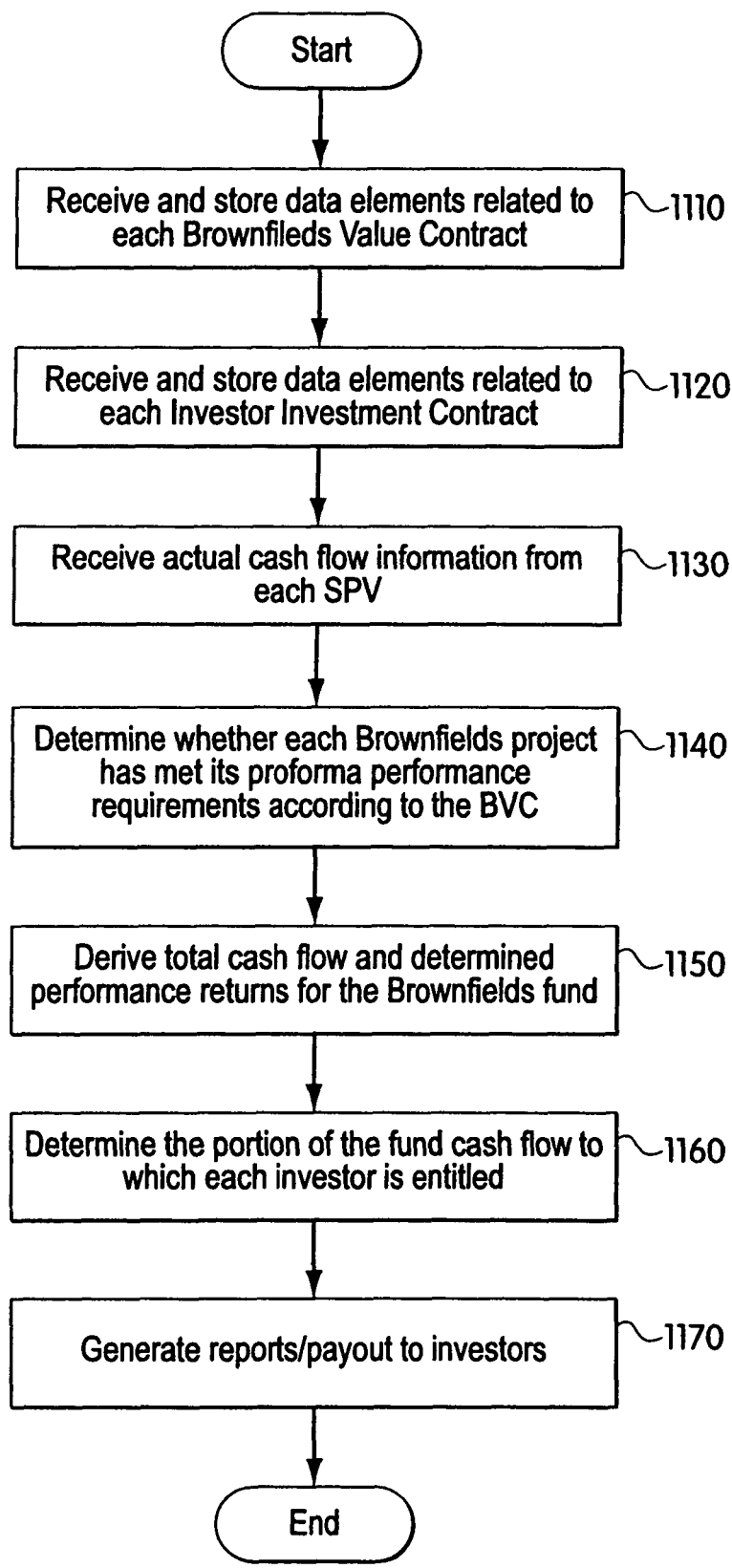
FIG. 11 is a flowchart illustrating the administration of cashflows in accordance with the present invention.

Cashflow Administration: FIG. 11 is a flowchart illustrating the administration of cashflows in accordance with the present invention. The administration may be performed using the computer based system shown in FIG. 1.

Initially, data related to each BVC are received and stored at, for example, in a data base at the central site (step 1110). The data may include an identification of the special purpose vehicle, ownership distribution requirements, cash flow requirements, equity contributions and performance requirements. Additionally, data related to each investor and investment contract may be received and stored in the data base at the central site (step 1120). For example, an identification and address of each investor, as well as an indication of each investors total investment, terms of the investment and/or any investment agreements.

Next, as a Brownfields project progresses, each special purpose vehicle transmits to the central site an indication of the special purpose vehicle's actual cash flow in connection with the Brownfields project (step 1130). This indication may be transmitted electronically, or may be, for example, hand delivered, delivered by mail or deposited into a bank lockbox system and subsequently entered into a database at the central site.

A determination is then made as to whether each of the Brownfields projects has met its performance requirements (step 1140). This determination can be made, for example, by comparing the performance requirements of each Brownfields project to the actual cash flow from the special purpose vehicle associated therewith.

The total cash flow to the Brownfields fund can then be determined (step 1150) by, for example, summing the actual cash flow from each special purpose vehicle. Additionally, the portion of the total fund cash flow to which each investor is entitled can be determined as a function of the data stored in connection with the Investor Investment Contracts (step 1160).

Finally, reports can be generated at the central site for distribution to the investors (step 1160), showing, for example, the performance of the Brownfields fund, and possibly each Brownfields project and/or special purpose vehicle. Additionally, each investor may be paid (either electronically or otherwise) a respective share of the total cash flow (i.e., a return on investment) in accordance with the terms of the Investor's Investment Contract.

In an example embodiment of the present invention, the Brownfields fund 100 may function as an administrator of the capital provided under the BVC 112, establishing a type of a lock box arrangement with respect to all positive and negative cash flows of the Brownfields project(s) 120 financed with the BVC 112, further protecting the priority rights of the Brownfields fund 100 to the future positive cash flow from the Brownfields project(s) 120 and Brownfields property, as opposed to how cash flow may be managed or administered under a conventional loan arrangement.

In a traditional loan arrangement, the borrower makes a draw request to the capital provider (e.g., a lender or an equity capital provider) for funds to cover a portion of completed work on a project. After inspecting that the work was completed, the capital provider will release the requested funds to the borrower. The borrower will then pay off its vendors for work accomplished by the vendors. In the event that the borrower does not apply the released funds to the vendors, each vendor may have a lien or interest on, inter alia, the cash flow from the project or work, to stake a claim to the borrower's other funds on the project and on other projects, in order to satisfy their unpaid claims against the borrower. The claims of a borrower's unsecured lenders will not be satisfied until after the mechanic's liens have been satisfied.

In contrast, the Brownfields fund 100 does not release the investment capital or funds under the BVC 112 directly to the SPV 110. The SPV 110 will request funds under the BVC 112 in order to pay off the vendors or contractors for their work on the Brownfields project(s) 120 in question. The Brownfields fund 100 will inspect that the work has been accomplished, and release the investment capital or funds directly to the vendors or contractors on behalf of the SPV 110. Since the SPV 110 does not have direct access to the investment capital provided under the BVC 112, and cannot use the provided investment capital for purposes outside of the Brownfields project(s) 120, the Brownfields fund 100 is less exposed to liability from mechanic's liens and the other liens and interests of the vendors or contractors than under a traditional loan arrangement.

Future cash flows from the Brownfields project(s) 120 and/or property may be generated by additional financing (e.g., traditional debt financing) incurred by the SPV 110 outside of and apart from the investment capital of the Brownfields fund 100, as well as from other transactions associated with the projects 120 and/or property in question, including transferring ownership of part or all of the Brownfields property, leasing portions (e.g., residential or commercial units), and other positive cash flow generating ventures.

In accordance with the terms of the BVC 112, the Brownfields fund 100 has a priority to such future cash flows associated with one or more Brownfields projects 120 and property, over the liens or other interests or security of other investors (including equity investors providing equity financing, and lenders providing debt financing outside and apart from the Brownfields fund 100 and the BVC 112), vendors, contractors, creditors, and other third parties.

The Brownfields fund 100 may further preserve and protect its priority by filing a lien or other legal claim or interest in the future cash flows associated with the BVC 112 and the one or more Brownfields projects 120 and property financed by the BVC 112. The lien or other legal claim or interest held by the Brownfields fund 100 will give the Brownfields fund 100 priority over the rights of the SPV 110 and third parties to such cash flows, until terms of the BVC 112 are fully satisfied (e.g., when the BVC 112 is fully repaid or compensated for the investment capital provided for the project 120).

A portion or all of the capital provided by the Brownfields fund 100 under the BVC 112 to the SPV 110, may be secured with a lien (e.g., a mechanic's lien) or or other legal claim or interest, without materially altering the minimal exposure of the investors 105, if any, to remediation liability. Although liens and other legal claims and interests may be regarded, in certain circumstances, as indicia of ownership, under CERCLA Section 101(20)(A), as set forth above, certain liability is eliminated for lenders who hold indicia of ownership in a Brownfields property (including, for example, a facility) primarily to protect their interest in that property, provided they do no participate in management of the project or property.

The lien or other legal claim or interest held by the Brownfields fund 100 on the future cash flows associated with a BVC 112 and its related Brownfields project(s) 120 and Brownfields property may be filed or otherwise perfected alone, or together with or as part of a lien or other legal claim or interest on all or a portion of the Brownfields property (including, for example, a facility, the land itself, or other structures built on the property) to secure all or part of the capital provided under the BVC 112.

In the event that the Brownfields project is unable to repay the Brownfields fund 100, in accordance with the terms of the BVC 112, the Brownfields fund 100 is limited to using their rights to the secured assets which are subject to the liens or other legal claims or interest (whether the secured assets are limited to the future cash flows or also include all or part of the Brownfields property) in order to be compensated for all or part of the capital provided under the BVC 112. The Brownfields fund 100 has no other recourse against the SPV 110 (i.e., the Brownfields fund 100 provides capital on a non-recourse basis). The liens or other legal claims or interests protects the BVC's priority to cash flows from the Brownfields project, by protecting the fund 100 and the BVC 112 from other claims against the SPV 110, but it does not upset the passive characterization of the involvement of the investors 105 and the Brownfields fund 100. The existence of the liens or other legal claims or interests in the BVC 112 does not amount to having the investors 105 or the fund 100 participate in the management of the property.

In an example embodiment of the present invention, the capital investment vehicle for the Brownfields projects, the BVC 112, may be structured with tranches, as shown in Examples 1 and 2 in FIG. 12 for providing different classes of financing, such as different classes of debt and equity financing, to the SPV's for specific Brownfields projects.

Tranches in a capital investment vehicle, such as a BVC 112, provide different classes of equity and/or debt financing in the invested entity (e.g., the SPV 110) and/or project (e.g., the Brownfields project(s) 120). Each class may have its own distinct parameters, such as, e.g., duration, maturity date, return, priority and/or payment terms. Each class may have its own distinct characteristics, such as, e.g., the risk/return profile associated with the type of financing provided under the tranche. There may be two or more separate tranches: two or more classes of equity financing, two or more classes of debt financing, or at least one class of debt financing and at least one class of equity financing in a capital investment vehicle. The different tranches may enhance the overall performance or return for the vehicle, by optimally allocating amounts of one or more of the classes of financing at each of the various phases of a project. The different tranches in a capital investment vehicle may also increase the capitalization of the vehicle, by offering investors (e.g., the Brownfields fund investors 105) a variety of ways to participate in the vehicle, depending on their risk/return profiles.

In this embodiment, the BVC 112 is structured with two or more classes of financing, as shown in FIG. 12. In example 1, an equity position of $3 Million, may be taken, for example, by SPV 110. The debt financing provided by the BVC 112, includes or is provided under a Senior tranche of $50 Million, a Subordinate tranche of $11 Million, and a First Loss or 1st Loss Position or tranche of $1.842 Million. The financing provided under the 1st Loss Position tranche may be characterized as equity and/or debt financing. The Senior tranche, with the largest position, has the first right to payment from the SPV's future cash flows, and as such, earns the lowest return of all three classes of financing. The Subordinate tranche offers a smaller position, has the second right to payment from the SPV's future cash flows, and as such, earns the second lowest return of all three classes of financing. The 1st Loss Position is the highest risk of all three levels of financing. A 1st Loss Position is a position that will suffer the first economic loss if the Brownfields project loses enough value to impact the repayment or compensation of the BVC. The 1st Loss Position carries a higher risk and a higher return than the other tranches. In this example, the 1st Loss Position provides the smallest amount of funding, but has the last right to payment, after the Senior and Subordinate tranches. Thus, the 1st Loss Position earns the highest return of all three classes of financing, which is lower in return and risk only from the $3 Million Equity position, which may be taken by the SPV 110. By offering a risk and return that is close to the risk and return for the Equity position, the 1st Loss Position tranche offers the Brownfields fund 100, and the investors 105, equity-like participation and returns from a Brownfields project 120, without incurring the environmental remediation liability that is borne by the equity investor, e.g., the SPV 110. The fund 100 and the investors 105 still do not participate in the management of the project and/or the property, thus remaining passive with respect to the Brownfields project and property, even if the repayment of one or more of the Senior tranche, Subordinate tranche and 1st Loss Position are secured with a lien or other legal claim or interest on the future cash flows from the Brownfields project 120 and/or property, and/or on all or part of the Brownfields property.

In example 2, there are only two classes of financing or investment capital (tranches) provided by BVC 112: a Senior tranche of $58.8 Million, and a Mezzanine tranche of $4 Million. Similar to Example 1, the Senior tranche, with the largest position, has the first right to payment from the SPV's future cash flows, and as such, earns the lowest return of the two classes of financing. The Mezzanine tranche offers a smaller position, has the second right to payment from the SPV's future cash flows, and as such, earns the higher return of the two classes of the financing. As in example 1, the repayment of either or both the Senior tranche and Mezzanine tranche can be secured with a lien or other legal claim or interest, without incurring the environmental remediation liability that is borne by the equity investor, e.g., the SPV 110.

In addition, in either example, the Senior tranche may provide recourse financing for construction or other development work, once remediation work has been accomplished, while one or more of the Mezzanine or Subordinate tranche(s) and 1st Loss Position provide non-recourse financing for the remediation portion of the project 120. Alternatively, the senior debt may be provided on a non-recourse basis throughout all phases of a Brownfields project 120. Each tranche, whether providing recourse or non-recourse debt or equity financing, may also be unsecured or secured with a lien, or other legal claim or interest on the future cash flows and/or all or part of the Brownfields property.

The Brownfields fund 100 may tranche the BVCs 112, but offer investors 105 only one class of capital investment or type of participation in the fund 100, e.g., one class of securities. Alternatively, the Brownfields fund may capitalize each of the tranches with a respective class of capital financing. Some of the classes of capital financing may allow some investors 105 to participate in the fund as debt investors (e.g., a lender to the Brownfields fund 100 leveraging the fund 100), and not participate solely as equity investors. Regardless, each class of capital financing may offer a different risk/return for the investor 105 depending on his/her risk/return profile. The variety of classes, as described above, may enhance the capitalization of the fund 100. Upon receiving a share of the positive cash flow according to the terms set forth in the BVC 112, the fund would allocate the various portions of the received cash flow to each of the capital classes in the fund, according to terms with which the capital financing was provided.

Additionally, the Brownfields fund 100, may vary the tranches offered in each BVC 112 as a function of the changing structure of the capitalization of the Brownfields fund 100, itself. For example, at the inception of a Brownfields fund 100, the fund 100 may be leveraged with debt itself, as mentioned above, in order to provide a sufficient funding base for providing one or more BVCs 112. Or, the Brownfields fund manager may choose, at any time, a particular amount of leverage for the fund, in order to maximize the returns available to its investors 105 while providing a large base of low cost funding for the Brownfields fund 100 and/or projects 120. The debt provided to the Brownfields fund 100 may be allocated, for example, to the Senior tranche and Subordinate tranche in the BVC 112. Capital from the investors 105 in the Brownfields fund 100 may be allocated to the 1st Loss Position. The leveraging may be used to reduce the cost of the BVC, by providing a large source of financing for the specific Brownfields projects at a lower cost than the invested capital in the Brownfields fund 100. As described above, the investors 105 in the fund 100, may earn an equity-like return on the 1st Loss Position without incurring the remediation liability held by an equity investor in the Brownfields.

The Brownfields fund 100 may reduce the amount of leverage as it receives more capital from its investors 105, and, reduce the Senior and Subordinate tranches, while increasing the 1st Loss Position. Alternatively, the Brownfields fund 100 may offer investors 105 with a more conservative outlook/profile the opportunity to participate in the least risky Senior position or tranche, earning the lowest return on their investment, and continue to offer the SPVs 110 a large source of lower cost financing for the Brownfields projects 120. The amount of leveraging may be one of the General Fund Investment Criteria, for example, as part of the possibility of leveraging of the fund 330, as shown in FIG. 3.

The relative and/or absolute levels of the tranches of a BVC 112 may remain constant throughout a particular Brownfields project. Alternatively, the positions taken by the various tranches at each phase may vary, as deemed necessary by the fund manager 115, according to, for example, a general project investment criterion 220. For example, different levels of each tranche of financing may be applied at different periods of time or at different stages of remediation or development or redevelopment during the Brownfields project, have different payment terms and different payment periods.

In any case, the parameters of the tranches may be specified along with the other terms and conditions in the BVC 112, such as, for example, details of the repayment, the interest in future cashflows provided until repayment, priority of the various tranches, and the maturity term of the various tranches, for example, as one of the General Project Investment Criteria 220, and/or as part of the Technical Project Criteria 230. The parameters of the tranches may also be specified or provided at the discretion of fund manager 115.

In an example embodiment of the present invention, an SPV 110 may also take advantage of traditionally available recourse and non-recourse debt and/or equity financing means apart or outside from the Brownfields fund 100 without subjecting the investors in the Brownfields fund 100 to environmental remediation liability, provided that such additional financing is permitted by the fund manager 115, and does not disturb the passive nature of the involvement by the Brownfields fund's investors 105, and does not alter the priority enjoyed by the BVC 112 to the returns or positive cash flows on the Brownfields property, which in turn, defines the return for the Brownfields fund 100.

Figure 13:
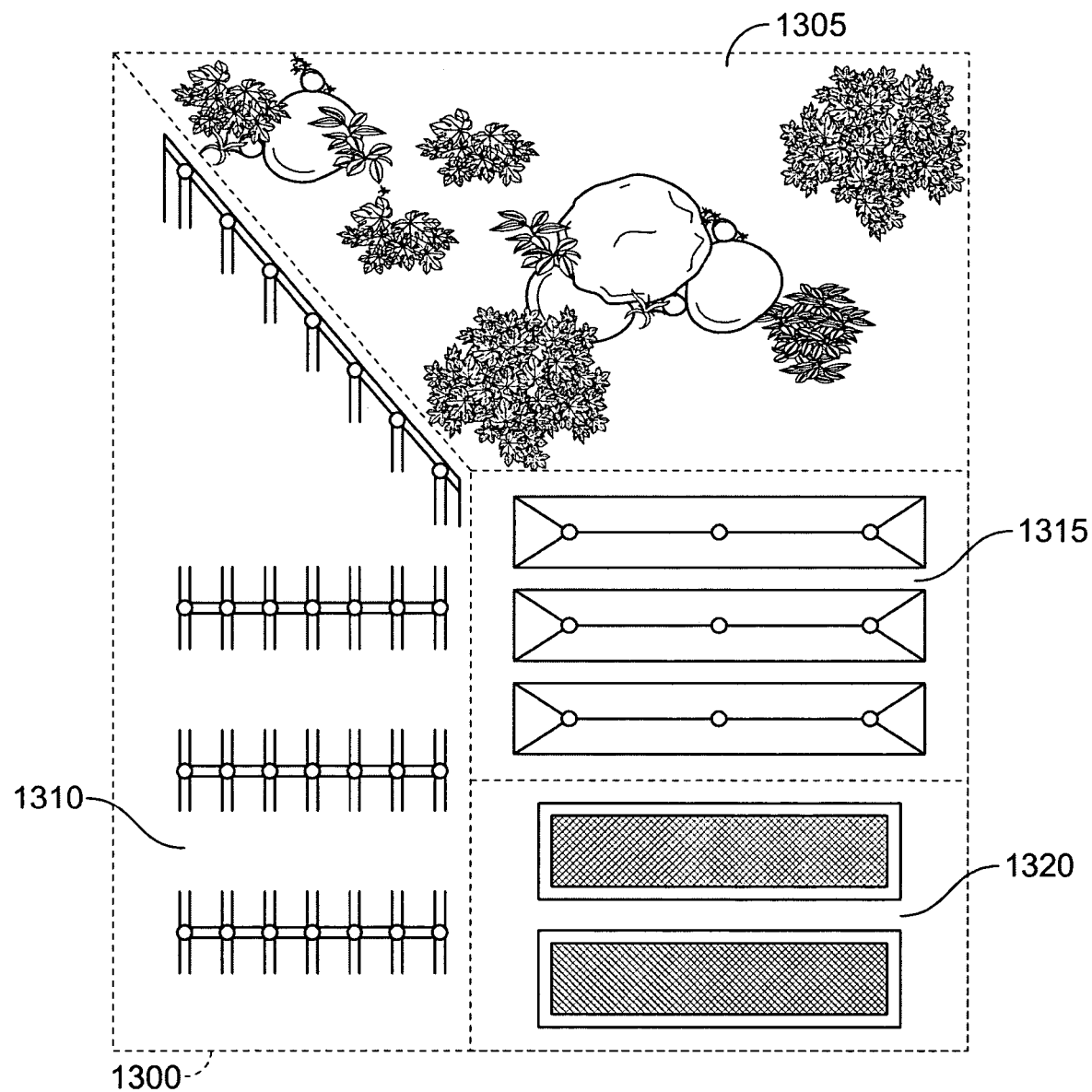
FIG. 13 shows the division of a Brownfields property into various portions or parcels requiring different amounts of remediation and development work, according to an example embodiment of the present invention.

As shown in FIG. 13, any given parcel or piece of Brownfields property 1300 may be zoned or dividable into two or more portions, even though the particular property may not be legally separable into parcels which can be separately owned and developed. Each portion may require a different amount of remediation before commencing any construction or other development work. The Brownfields property 1300 may have one or more portions requiring no remediation work, such as greenfield portion 1305. The Brownfields property 1300 may have one or more portions requiring little or relatively lower-risk remediation work, e.g., a vacant parking lot portion 1310 with a few lampposts and concrete barriers. There may even be a portion 1315 of the Brownfields property 1300 requiring more significant remediation work, but for which the SPV 110 or other equity interest may prefer, for any of a number of reasons, to remediate and develop with more traditional sources of funding, while financing the remediation and development of another portion of the Brownfields property 1320 under one or more BVCs 112.

For example, an SPV 110 may take on or accept additional recourse or non-recourse debt and/or equity financing such as a mortgage or offer mortgage-backed securities to third party investors with respect to portions 1305, 1310, 1315 of the Brownfields property 1300, while accepting financing from the Brownfields fund 100 under a BVC 112 for the remediation and development of portion 1320.

However, assuming that SPV 110 does not incur any financing outside of the BVC 112, other than the equity invested by the SPV 110, for a particular Brownfields project 120 and property, the Brownfields fund 100 can provide financing in the form of the above-described tranched BVC, in order to finance each phase of the remediation and development of each portion of the Brownfields property with a different level of capital under one or more of the different tranches, which maximizes the returns for investors 105 in the Brownfields fund 100. For example, for the remediation phase of one portion, 75% of the capital may be provided under a secured, non-recourse Subordinate Debt tranche, and 25% of the capital may be provided under a secured, non-recourse Senior Debt tranche. For the development phase of another portion of the same property, 85% of the capital may be provided under an unsecured, recourse Senior Debt tranche, and 15% of the capital may be provided under an unsecured, non-recourse 1st Loss Position. There are a number of combinations possible for each phase of work on each portion of the property for the capital provided under the tranched BVC, and whether the capital provided under each tranche is unsecured or secured debt and/or equity financing, the priority of each class of capital to the future cash flows from the project and/or property, and whether each class of capital is provided on a recourse or non-recourse basis. The fund manager 115 may determine the optimal combination of financing for each project 120 that would maximize the return and minimize the risks and other liabilities of the Brownfields fund 100.

Figure 14:
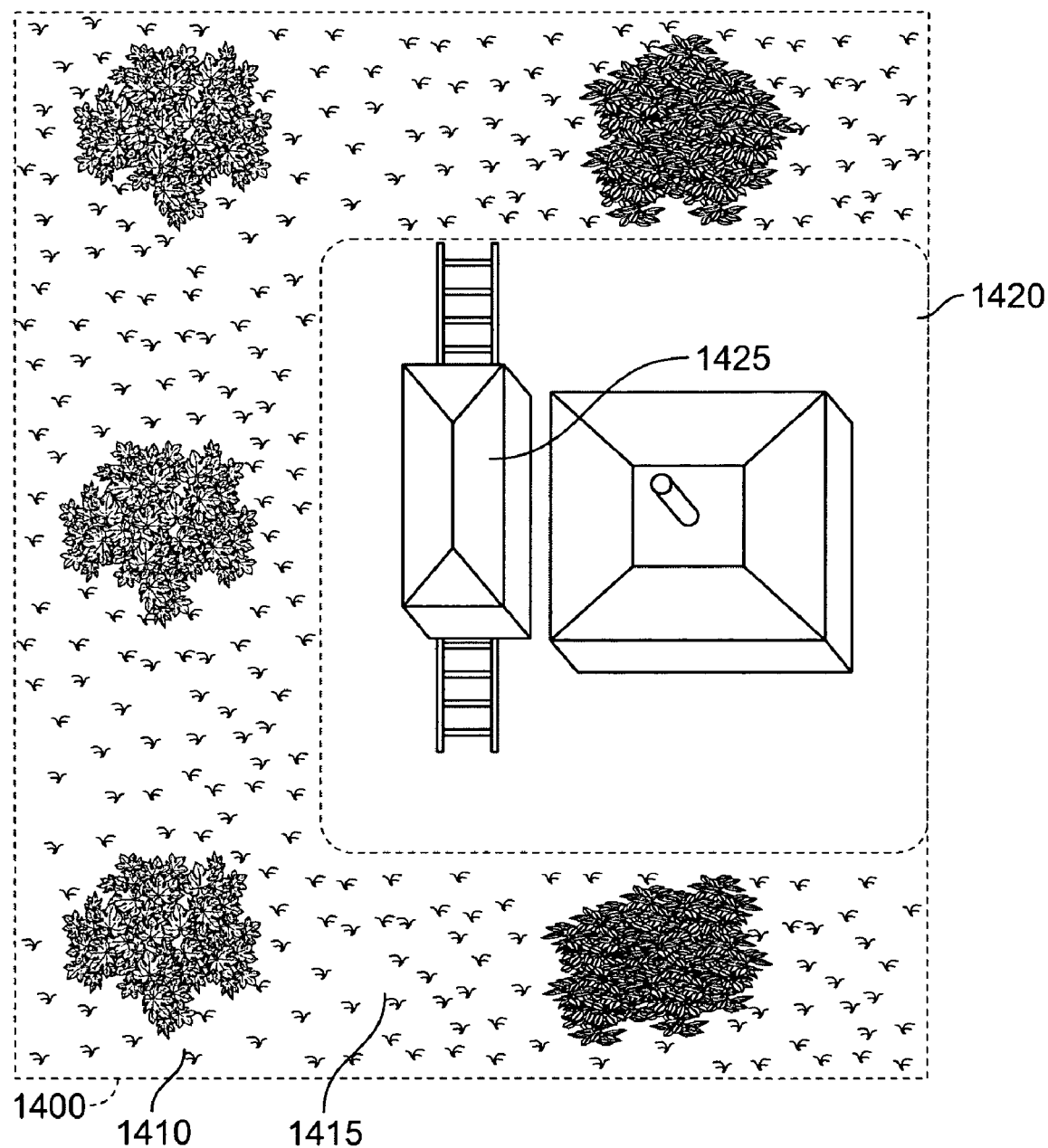
FIG. 14 shows the division of a Brownfields property into two portions or parcels, a clean portion requiring no remediation work, and a dirty portion requiring remediation and development work, according to an example embodiment of the present invention.
Figure 15:
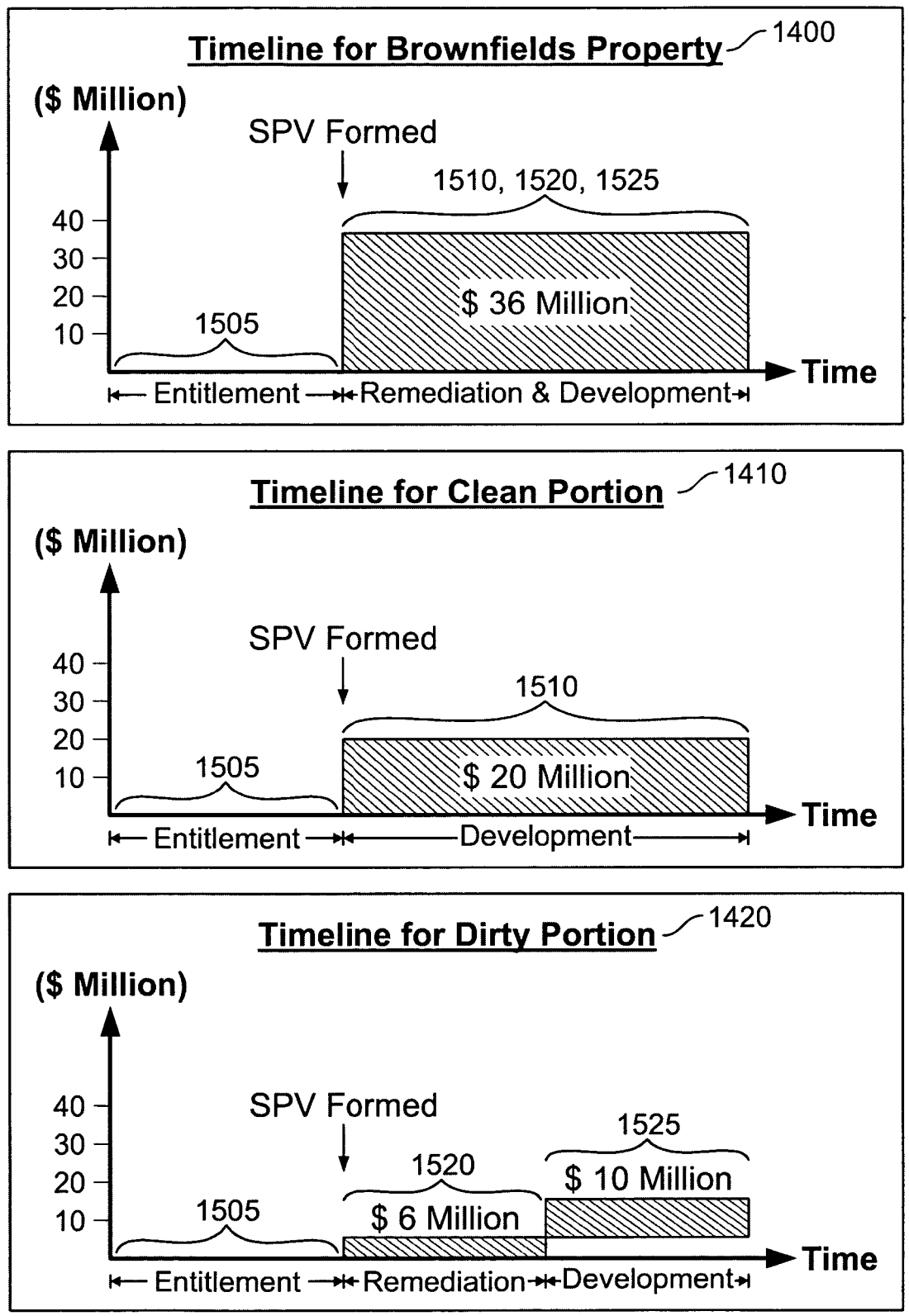
FIG. 15 shows timelines and funds for a Brownfields project on the Brownfields property shown in FIG. 14, including the entitlement or zoning, remediation and development phases of work on the Brownfields property, the entitlement and development phases of work on the clean portion of the property, and the entitlement, remediation and development phases of work on the dirty portion of the property, according to an example embodiment of the present invention.
Figures 16, 17:
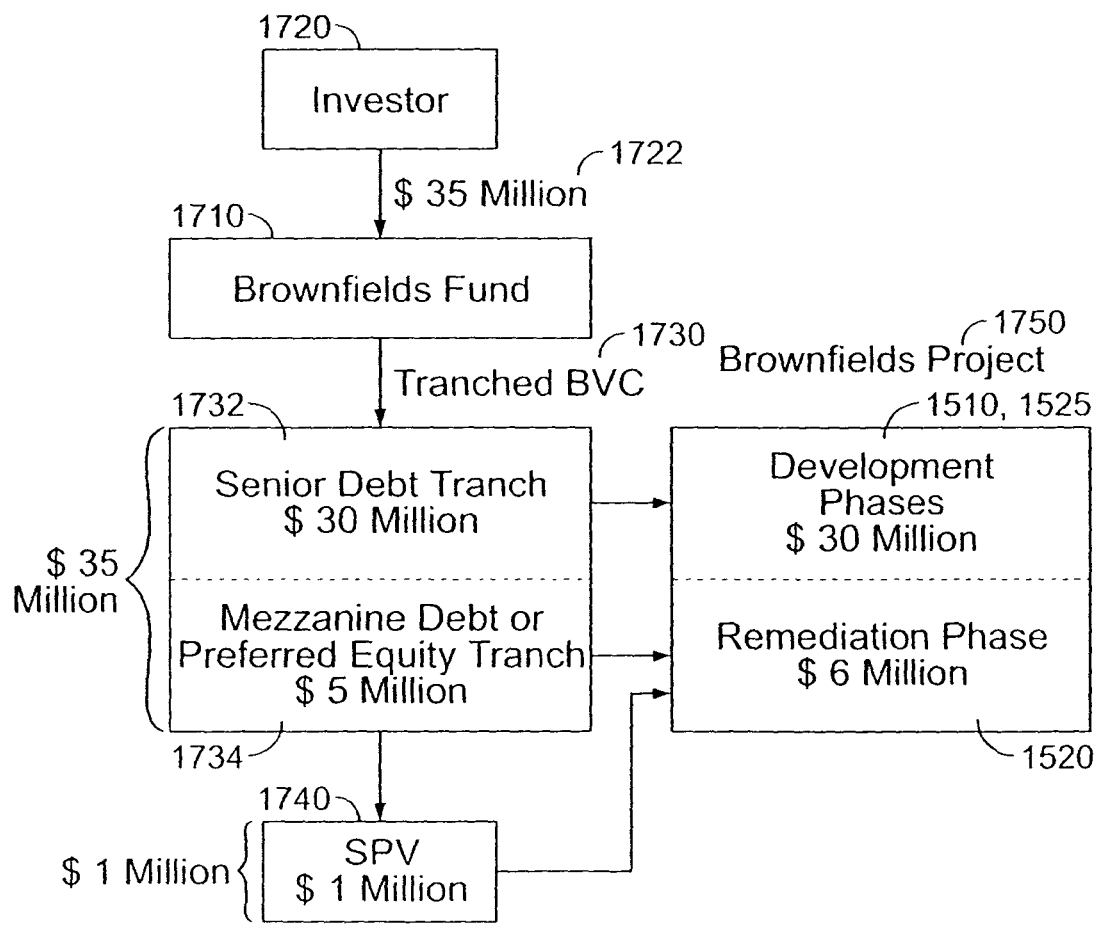
FIG. 16 shows sources and uses of funds for the Brownfields project shown in FIGS. 14 and 15, according to an example embodiment of the present invention.
FIG. 17 shows an overview of an overall architecture of a system for Brownfields development with a tranched BVC, for the Brownfields project shown in FIGS. 14 and 15, according to an example embodiment of the present invention.

FIGS. 14 to 16 shows an implementation of using a tranched BVC 112 to finance a Brownfields project on a Brownfields property 1400 having two portions: a "clean portion" 1410, and a "dirty portion" 1420. The Brownfields property 1400 may include an abandoned railroad station 1425 and surrounding land 1415. The surrounding land 1415, while still within the metes and bounds of the Brownfields property 1400 is the "clean portion" 1410 and does not require remediation work. The portion containing the abandoned railroad station 1425 is the "dirty portion" 1420 requiring remediation, before the commencement of any development work.

FIG. 15 provides three timelines showing a series of phases and funding levels involved in the remediation and development of the Brownfields property 1400. First, there is an entitlement phase 1505 of the entire Brownfields property, in which the property is zoned or parceled or otherwise divided into clean portion 1410 and dirty portion 1420. Then, the SPV 110 may be formed, and ownership of the property 1400 may be transferred to the SPV 110. For the clean portion, there is a development phase 1510 following the entitlement phase 1505. The development phase 1510 of clean portion 1410 may be begin after the formation of the SPV 110, including construction and infrastructure work. The remediation phase 1520 of dirty portion 1420 may begin after the formation of the SPV 110, including remediation and infrastructure work. The development phase 1525 of dirty portion 1420 may begin, after completion of remediation phase 1520 of dirty portion 1420, e.g., after receiving notice from the Environmental Protection Agency and other governmental agencies and authorities that no further action is required to remediate or clean the dirty portion 1420 of property 1400. Remediation phase 1520 and development phase 1525 of dirty portion 1420 may occur at the same time as development phase 1510 of clean portion 1410.

Development phase 1510 of clean portion 1410 may be financed with debt, e.g., in the amount of $20 Million, which has a lien or other legal claim or interest in the structure to be built on the clean portion 1410, the clean portion 1410, or the entire property 1400. Remediation phase 1520 of dirty portion 1420 may be financed with $6 Million debt financing. The financing for the remediation phase 1520 may be unsecured debt financing, or secured with a lien or other legal claim or interest in the structure to be built on the dirty portion 1420, the dirty portion itself 1420, or the entire property 1400.

Development phase 1525 of dirty portion 1420 may be financed with $10 Million debt financing, which can be secured or unsecured debt. In this example, the $30 Million is provided for development phases 1510 and 1525 as senior secured debt, and the lien is limited on the construction work, e.g., a building built on the clean portion 1410, and does not extend to the remediation work, the dirty portion 1420, or any of the rest of the underlying property 1400. The $6 Million non-recourse financing for remediation phase 1520 includes $1 Million equity contributed by SPV 110, and $5 Million preferred equity or mezzanine debt (non-senior tranche) provided by a BVC, as shown in FIG. 16. However, in other examples, the senior debt may be unsecured, or secured with a lien on the entire property 1400, and the preferred equity or mezzanine debt may be unsecured, or secured with a lien on a portion or the entire property 1400, as well.

FIG. 17 shows an overview of cash flows associated with this example embodiment. Brownfields fund 1710 accepts from investors 1720 an investment 1722. In the above-described example, the investment may be in the amount of $35 Million. The investment, or a portion thereof, is then provided in a tranched BVC 1730 to an SPV 1740 for a Brownfields Project 1750. The tranched BVC 1730 includes two tranches: a senior tranche 1732, and a mezzanine debt or preferred equity tranche (non-senior tranche) 1734. The senior tranche 1732 of the project undertaken as shown in FIGS. 15 and 16 may be in the amount of $30 Million, which is used to finance the development phase 1510 of clean portion 1410, and development phase 1525 of dirty portion 1420. The senior tranche 1732 has a priority to cash flows from the Brownfields project 1750, generated during and as a result of development phases 1510 and 1525. The senior tranche 1732 may, itself, be capitalized with secured debt financing provided by an investor 1720 who is a lender to the Brownfields fund, alone, or together with unsecured debt and/or equity financing from other investors 1720.

The non-senior tranche 1734, may be in the amount of $5 Million, used, together with $1 Million equity from SPV 1740, for remediation phase 1520 of dirty portion 1420. The non-senior tranche covering the remediation of the dirty portion 1420 is unsecured, as set forth above.

Figure 18A:
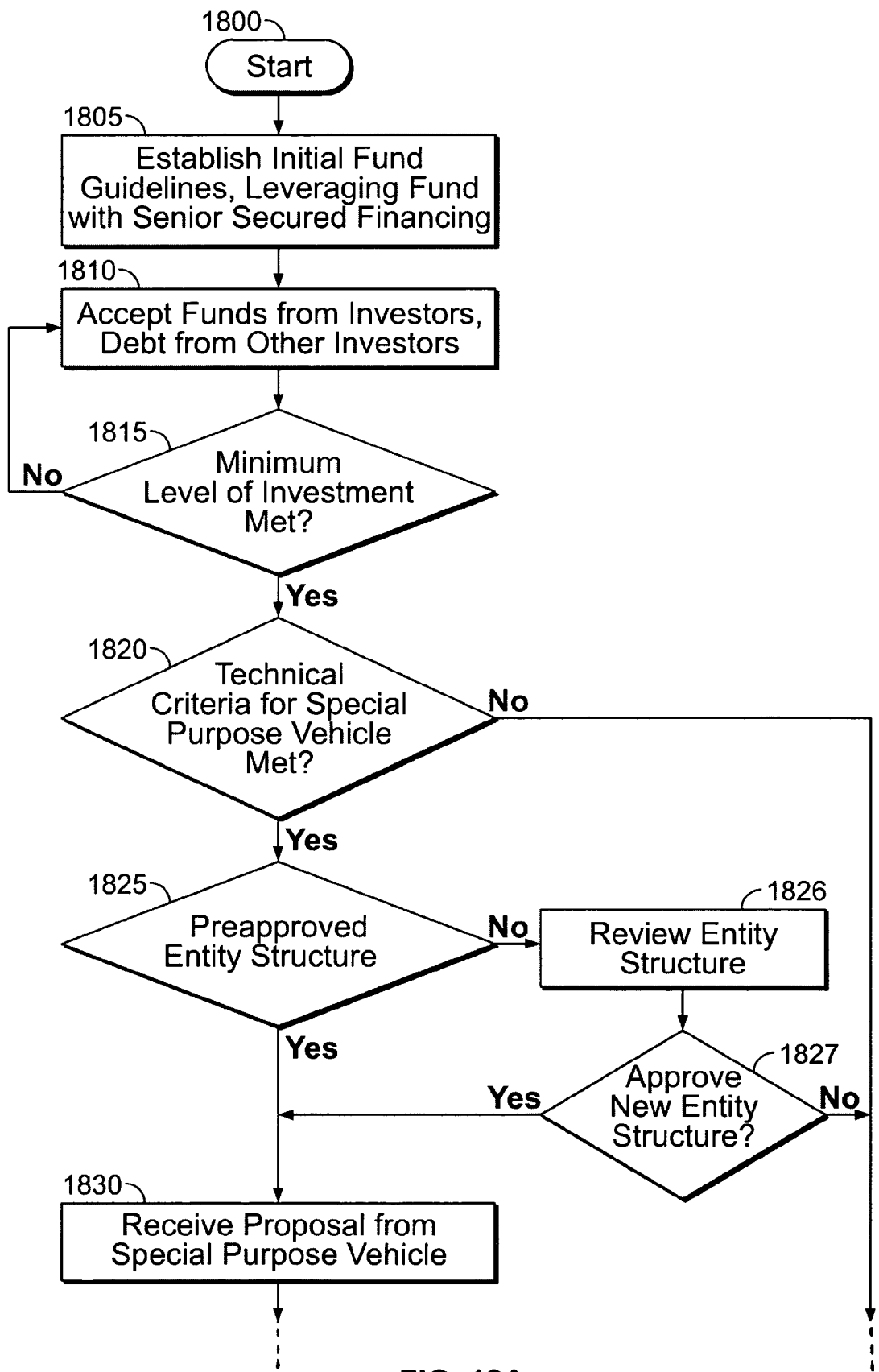
FIG. 18 is a flowchart showing an example method for establishing a fund, approving special purpose vehicles and their respective Brownfields process, providing a tranched BVC, zoning the Brownfields property into parcels which include a "clean portion" and "dirty portion," developing the clean portion with Senior debt, remediating the dirty portion with non-recourse debt, and developing the dirty portion with Senior debt, according to an example embodiment of the present invention.
Figure 18B:
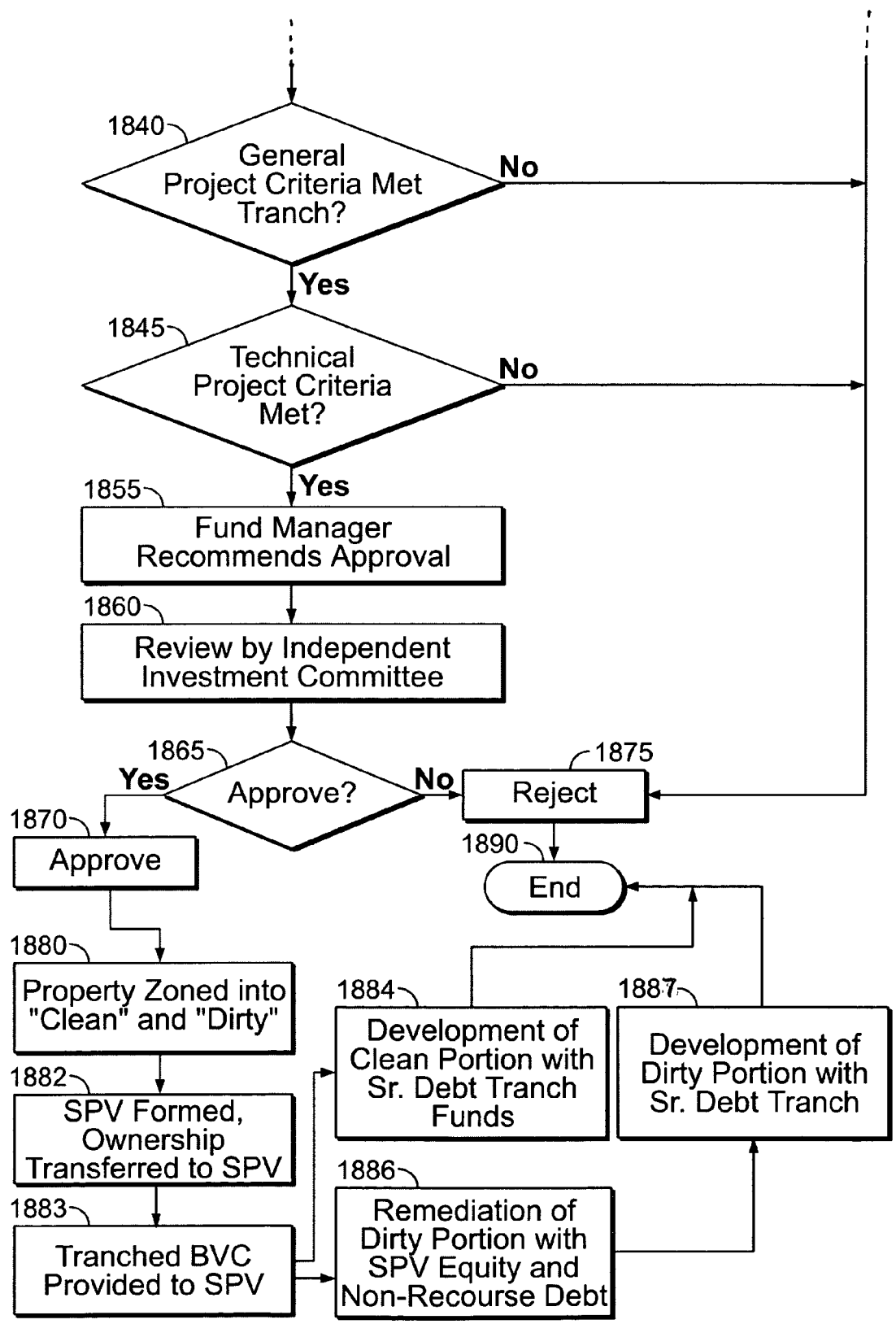

FIG. 18 shows a flow chart providing an example method for providing such a tranched BVC 1730 to fund Brownfields project 1750, which may be carried out as part of the method shown and described with reference to FIG. 9. This method may be partially or completely performed using the computer based system shown in FIG. 8. The method may also be carried out without any computer based system. Although the steps in this method, and the steps shown and discussed with reference to FIG. 9 are presented in a sequential fashion, they may be occurring simultaneously or in a different order.

In accordance with an example embodiment of the present invention, initial fund guidelines are established for the Brownfields fund in accordance with the general fund investment criteria described above, including an amount of leveraging the fund, for example, with senior secured debt financing (step 1805). These guidelines may be input, for example, from the fund manager terminal and stored in databases at the central site.

Once the guidelines are established, the Brownfields fund begins accepting funds (e.g., equity capital) from some investors, and may become leveraged by accepting debt financing, such as senior secured debt financing from other investors (step 1810). The investors may transmit funds to the Brownfields fund via, for example, mail, electronic funds transfer, hand delivery, or may authorize a funds transfer via an investor workstation or via a telephone, as in step 910.

As soon as the investment level is high enough (steps 1815, 1810), the Brownfields fund determines whether or not prospective special purpose vehicle meets the technical criteria (step 1820), similarly to step 920 discussed above, and as shown in FIG. 9.

Assuming the special purpose vehicle meets the technical criteria and the form of the special purpose vehicle is determined to be acceptable, the Brownfields fund receives a project proposal from the special purpose vehicle (step 1830). A Brownfields project proposal may be transmitted to the fund manager via, for example, mail, facsimile, hand delivery, etc., or may be electronically transmitted to the central site via an SPV workstation. Details of the proposal may be manually or automatically entered and stored at the central site.

In the example embodiment of the present invention, once a particular proposal is received, the fund manager determines whether or not the proposed Brownfields project meets the general project investment criteria, for example, as described in connection with FIG. 4, and which may also include a criterion for a tranched BVC structure (step 1840). If not, the proposal is rejected (step 1875). If the proposed Brownfields project does meet the general project investment criteria, the fund manager determines whether or not the proposed Brownfields project meets the technical project criteria, as described in connection with FIG. 5 (step 1845), including a criterion of whether the property can be zoned into separate clean and dirty portions. If either the general project investment criteria or the technical project criteria are not met, the proposal is rejected (step 1875).

According to the present invention, the fund manager may perform steps 1820, 1840 and 1845 using a computer rules-based system (other systems are possible). For example, each of the general project criteria, technical project criteria and technical criteria for the special purpose vehicle may be stored in the system in the form of a rule. Using the rules-based system, the details of the project proposal may be compared to the stored rules. Thus, steps 1820, 1840 and 1845 may be performed automatically at the central site. Alternatively, the criteria may be stored in databases, and printed out by the fund manager. The fund manager could then manually compare the details of the project proposal to the criteria.

If all of the above-described criteria are met, the fund manager recommends approval of a capital investment to the special purpose vehicle for the Brownfields project (step 1855). The proposal is then reviewed by the Independent Investment Committee (1860) for final approval. The Independent Investment Committee may review the proposal as compared to the same criteria used by the fund manager, or may review the proposal in terms as compared to other criteria.

Finally, if the Independent Investment Committee approves the proposal (step 1865), the special purpose vehicle and proposed Brownfields project is finally approved (step 1870), thus the Brownfields fund provides a capital investment to the special purpose vehicle for the proposed Brownfields project through the terms of a tranched BVC. Otherwise, the proposal is rejected (step 1875). An indication that the capital investment has been approved or rejected may be transmitted to the special purpose vehicle electronically by the central site. Alternatively, the fund manager or the Independent Investment Committee may provide the indication via the telephone or mail.

Once the capital investment has been approved, the Brownfields property is planned and zoned or divided into portions or parcels, including, for example, a clean portion and a dirty portion (step 1880). The zoning may occur during the entitlement phase, and according to local, state and federal regulations. After the zoning step (step 1880), the special purpose vehicle is formed, and ownership of the property is transferred to the special purpose vehicle (step 1882). The clean portion of the property is then developed with funding from the senior tranche of the BVC (step 1884), or with a combination of the senior and non-senior tranches. The dirty portion of the property is remediated with funding from the non-senior tranche of the BVC, and with funding from the equity invested by the special purpose vehicle (step 1886), or a combination of the senior and non-senior tranches (with or without the equity). Once the remediation is complete, the dirty portion of the property is then developed with funding from the senior tranche or combination.

In the preceding specification, the present invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A computer-implemented method for investing in Brownfields, comprising:
    establishing a Brownfields fund, the Brownfields fund providing investment capital for a Brownfields project and remaining passive with respect to the Brownfields project;
    receiving investor capital from investors;
    approving an entity for the investment capital for the Brownfields project according to predetermined criteria, the entity having an ownership interest in a Brownfields property associated with the Brownfields project; and
    providing the investment capital for the Brownfields project on behalf of the approved entity using at least some of the investor capital from the investors, at least a first portion of the investment capital being provided with a lien on at least a first portion of the Brownfields property; at least one of the steps is executed by a computer.

2. The method according to claim 1, wherein the providing step includes providing the at least first portion of the investment capital as financing secured by the lien on the at least first portion of the Brownfields property.

3. The method according to claim 1, wherein the providing step includes providing the investment capital with a lien on the at least first portion of the Brownfields property.

4. The method according to claim 1, wherein the providing step includes providing the at least first portion of the investment capital with a lien on the Brownfields Property.

5. The method according to claim 1, wherein the providing step includes providing the investment capital with the lien on the Brownfields property.

6. The method according to claim 1, wherein the providing step includes providing a second portion of the investment capital as unsecured financing for a remediation of a second portion of the Brownfields property.

7. The method according to claim 1, wherein the providing step includes providing the investment capital to the approved entity on a non recourse basis.

8. The method according to claim 1, wherein the entity is a special purpose vehicle.

9. The method according to claim 1, wherein the providing step includes providing a tranched Brownfields Value Contract to the entity, the investment capital being provided to the approved entity in accordance with terms of the tranched Brownfields Value Contract.

10. The method according to claim 9, further comprising:
    establishing a parameter of investment capital provided under each tranche in the tranched Brownfields Value Contract, the Brownfields Value Contract having at least two tranches of investment capital.

11. The method according to claim 10, wherein the parameter establishing step includes establishing at least one of an amount, a duration, a maturity date, return, priority, and payment terms for investment capital provided under a respective tranche.

12. The method according to claim 9, wherein the tranched Brownfields Value Contract providing step includes allocating portions of the investment capital to the entity in accordance with terms of tranches in the tranched Brownfields Value Contract, each tranche setting forth terms for a respective portion of the investment capital.

13. The method according to claim 12, wherein the allocating step includes allocating the first portion of the investment capital to the entity in accordance with terms of a senior tranche of secured financing under the tranched Brownfields Value Contract.

14. The method according to claim 12, wherein the allocating step includes allocating a second portion of the investment capital to the entity in accordance with terms of a mezzanine tranche in the tranched Brownfields Value Contract.

15. The method according to claim 12, wherein the allocating step includes allocating a second portion of the investment capital to the entity in accordance with terms of a preferred equity tranche in the tranched Brownfields Value Contract.

16. The method according to claim 12, wherein the allocating step includes allocating a second portion of the investment capital to the entity in accordance with terms of a first loss position tranche in the tranched Brownfields Value Contract.

17. The method according to claim 1, wherein the providing step includes providing the first portion of the investment capital for development of the at least first portion of the Brownfields property.

18. The method according to claim 17, wherein the first portion providing step includes providing the first portion of the investment capital for development of at least a second portion of the Brownfields property.

19. The method according to claim 12, wherein the providing step includes exchanging by the approved entity an interest in future cashflows from the Brownfields project for each tranche of investment capital from the Brownfields Value Contract, the future cashflow interest for a senior tranche having priority over the future cashflow interest for another tranche of investment capital from the Brownfields Value Contract.

20. The method according to claim 1, wherein the receiving step includes receiving at least one of debt and equity investments from investors, each of the investors being passive relative to all Brownfields projects.

21. The method according to claim 1, wherein the Brownfields project is at least one of: i) a development project, ii) a redevelopment project, and iii) an environmental remediation project.

22. The method according to claim 1, further comprising: zoning the Brownfields property into a clean portion and a dirty portion, the at least one first portion being at least the clean portion of the Brownfields property.

23. The method according to claim 22, further comprising: transferring the ownership interest of the Brownfields property to the entity.

24. The method according to claim 22, wherein the providing step includes allocating at least part of the first portion of investment capital towards development of the clean portion.

25. The method according to claim 24, wherein the providing step includes allocating at least part of a second portion of investment capital towards remediation of the dirty portion.

26. The method according to claim 22, further comprising: developing the clean portion of the Brownfields property by using at least some of the first portion of the investment capital.

27. The method according to claim 26, further comprising: remediating the dirty portion of the Brownfields property by using at least some of a second portion of the investment capital.

28. The method according to claim 27, wherein the remediating step is performed contemporaneously with the developing step.

29. The method according to claim 1, further comprising: leveraging equity investor capital in the Brownfields fund with debt.

30. The method according to claim 29, wherein the providing step includes providing the investment capital to the approved entity using at least some of the equity investor capital and at least some of the debt.

31. A computer-implemented method for managing a Brownfields fund, comprising:
   storing in a computer system information relating to a Brownfields fund;
   accepting investor capital from at least one investor;
   storing information in the computer system relating to the at least one investor, the stored information including investor identification information, investment amounts, and terms of investments;
   storing information in the computer system concerning an entity and a project involving a Brownfields, the entity having an ownership interest in the Brownfields;
   approving the entity and the Brownfields project according to predetermined criteria using the information stored in the computer system concerning the entity and the Brownfields project; and
   providing investment capital by the Brownfields fund for the approved Brownfields project on behalf of the approved entity, at least a first portion of the investment capital being provided with a lien on at least a first portion of the Brownfields; at least one of the steps is executed by a computer.

32. The method according to claim 31, wherein the investment capital is provided on a non recourse basis.

33. The method according to claim 31, wherein the providing the investment capital step includes exchanging by the approved entity an interest in future cashflows from the Brownfields project for the investment capital.

34. The method according to claim 33, further comprising:
   receiving by the Brownfields fund a portion of cashflows from the Brownfields project to generate at least a portion of a fund cashflow; and
   determining a portion of the fund cashflow to which each of the at least one investor is entitled as a function of the terms of investment stored in the computer system.

35. The method according to claim 31, wherein the providing step includes providing a tranched Brownfields Value Contract to the approved entity, and further comprising the step of:
   storing the terms of the tranched Brownfields Value Contract in the computer system.

36. A computer-implemented method of investing in Brownfields, comprising:
   providing investor capital to a Brownfields fund in accordance with predetermined terms of investment, the Brownfields fund providing investment capital for a Brownfields project and remaining passive with respect to the Brownfields project, the Brownfields fund approving an entity for the investment capital for the Brownfields project according to predetermined criteria, the entity having an ownership interest in a Brownfields associated with the one of the Brownfields projects, the investment capital being provided for the Brownfields project on behalf of the approved entity using at least some of the investor capital from the investor, at least a first portion of the investment capital being provided for the project on behalf of the approved entity with a lien on at least a first portion of the Brownfields associated with the Brownfields project; and receiving a return on the provided investor capital, the return being determined as a function of the predetermined terms of investment; at least one of the steps is executed by a computer.

37. The method according to claim 36, wherein the approved entity exchanges an interest in future cashflows from the Brownfields project for the investment capital, and wherein the return is determined as a function of actual cashflows generated by the Brownfields project to the Brownfields fund.

38. A computer-implemented method for investing in Brownfields, comprising:
    establishing a Brownfields fund, the Brownfields fund providing investment capital for a Brownfields project and remaining passive with respect to the Brownfields project;
    receiving investor capital from investors;
    approving an entity for the investment capital for the Brownfields project according to predetermined criteria, the entity having an ownership interest in a Brownfields property associated with the Brownfields project; and
    providing the investment capital to the approved entity using at least some of the investor capital from the investors, a first portion of the investment capital being provided on a non recourse basis for remediation of at least a first portion of the Brownfields property; at least one of the steps is executed by a computer.

39. The method according to claim 38, wherein the providing step includes providing a second portion of the investment capital on a recourse basis for development of at least one second portion of the Brownfields property.

40. A computer-implemented method for investing in Brownfields, comprising:
    establishing a Brownfields fund, the Brownfields fund providing investment capital for a Brownfields project and remaining passive with respect to the Brownfields project;
    receiving investor capital from investors;
    approving an entity for the investment capital for the Brownfields project according to predetermined criteria, the entity having an ownership interest in a Brownfields property associated with the Brownfields project; and
    providing the investment capital to the approved entity using at least some of the investor capital from the investors, at least a first portion of the investment capital being provided as secured financing; at least one of the steps is executed by a computer.

41. The method according to claim 40, wherein the providing step includes securing the investment capital with a lien on future cash flows associated with the Brownfields property and the Brownfields project.

42. The method according to claim 41, wherein the securing step includes securing the at least first portion of the investment capital with a lien on at least a portion of the Brownfields property.

43. The method according to claim 40, wherein the securing step includes securing the at least first portion of the investment capital with a lien on at least a portion of the Brownfields property.

44. The method according to claim 40, wherein the providing step includes providing at least part of the investment capital as one of equity financing and debt financing.

45. The method according to claim 40, wherein the receiving step includes receiving debt capital from debt investors.

46. The method according to claim 45, wherein the debt investors include lenders to the fund.

47. The method according to claim 40, wherein the receiving step includes receiving equity capital from equity investors.

48. A computer-implemented method of investing in Brownfields, comprising:
    establishing a Brownfields fund, the Brownfields fund providing investment capital for a Brownfields project and remaining passive with respect to the Brownfields project;
    receiving investor capital from investors;
    approving an entity for the investment capital for the Brownfields project according to predetermined criteria, the entity having an ownership interest in a Brownfields property associated with the Brownfields project; and
    providing at least two classes of investment capital for the Brownfields project on behalf of the approved entity using at least some of the investor capital from the investors, in accordance with terms of a tranched Brownfields Value Contract, each class of investment capital being provided in accordance with terms under its respective tranche; at least one of the steps is executed by a computer.

* * * * *